(12) United States Patent
Simons et al.

(10) Patent No.: US 11,572,480 B2
(45) Date of Patent: Feb. 7, 2023

(54) SURFACE REACTIVATION TREATMENT

(71) Applicant: THE BOEING COMPANY, Chicago, IL (US)

(72) Inventors: Ranya Simons, Melbourne (AU); Sheng Li, Melbourne (AU); Stuart Arthur Bateman, Melbourne (AU); Emma Simmonds, Melbourne (AU); Jill Elisabeth Seebergh, Seattle, WA (US); Jason A. Bolles, Seattle, WA (US); Douglas Henry Berry, Seattle, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 16/490,852

(22) PCT Filed: Feb. 27, 2018

(86) PCT No.: PCT/IB2018/051204
§ 371 (c)(1),
(2) Date: Sep. 3, 2019

(87) PCT Pub. No.: WO2018/158673
PCT Pub. Date: Sep. 7, 2018

(65) Prior Publication Data
US 2019/0382599 A1    Dec. 19, 2019

Related U.S. Application Data

(60) Provisional application No. 62/466,659, filed on Mar. 3, 2017.

(51) Int. Cl.
*C09D 7/61* (2018.01)
*C09D 7/40* (2018.01)
(Continued)

(52) U.S. Cl.
CPC .............. *C09D 7/61* (2018.01); *B05D 3/107* (2013.01); *C08K 3/04* (2013.01); *C08K 3/22* (2013.01);
(Continued)

(58) Field of Classification Search
CPC ............ B05D 3/107; C08K 2003/2227; C08K 2003/2244; C08K 3/04; C08K 3/22;
(Continued)

(56) References Cited

U.S. PATENT DOCUMENTS

| 8,920,885 B2 * | 12/2014 | DeAntoni ................. C08F 2/48 |
| | | 427/508 |
| 2002/0045010 A1 * | 4/2002 | Rohrbaugh .......... C11D 3/1253 |
| | | 427/372.2 |
| 2008/0050598 A1 * | 2/2008 | Bateman .................... C08J 7/12 |
| | | 428/426 |

FOREIGN PATENT DOCUMENTS

| EP | 1818693 A1 | 8/2007 |
| JP | 2001162220 A | 6/2001 |

(Continued)

OTHER PUBLICATIONS

Extended European Search Report for Application No. 21154151.1-1102 dated Apr. 21, 2020.
(Continued)

*Primary Examiner* — Shuangyi Abu Ali
(74) *Attorney, Agent, or Firm* — Patterson + Sheridan, LLP

(57) ABSTRACT

The present disclosure relates to a method of reactivating the surface of an organic paint coating, a method of facilitating adhesion of a further coating to the organic paint coating, and a substrate having a reactivated organic paint coating. There is also disclosed a surface reactivation treatment for an organic paint coating. The reactivation method also facilitates adhesion of the organic paint coating to further coating(s) across a broad application window.

25 Claims, 15 Drawing Sheets

(51) Int. Cl.
- *C09D 5/00* (2006.01)
- *C09D 5/02* (2006.01)
- *C09D 5/08* (2006.01)
- *B05D 3/10* (2006.01)
- *C08K 3/22* (2006.01)
- *C08K 3/04* (2006.01)

(52) U.S. Cl.
CPC ............... *C09D 5/006* (2013.01); *C09D 5/02* (2013.01); *C09D 5/08* (2013.01); *C09D 7/67* (2018.01); *C09D 7/68* (2018.01); *C08K 2003/2227* (2013.01); *C08K 2003/2244* (2013.01)

(58) Field of Classification Search
CPC . C09D 1/00; C09D 5/006; C09D 5/02; C09D 5/08; C09D 7/61; C09D 7/67; C09D 7/68
See application file for complete search history.

(56) References Cited

FOREIGN PATENT DOCUMENTS

| | | |
|---|---|---|
| JP | 3636203 B1 | 4/2005 |
| JP | 2008508416 A | 3/2008 |
| JP | 2008528247 A | 7/2008 |
| JP | 2009160538 A | 7/2009 |
| KR | 100900639 B1 | 6/2009 |
| WO | 2008125559 A1 | 10/2008 |
| WO | 2018158673 A1 | 9/2018 |

OTHER PUBLICATIONS

PCT Written Opinion of The International Searching Authority for Application No. PCT/IB2018/051204 as dated Feb. 27, 2018.
Notice of Reasons for Rejection for Japanese Application 2019-547656 dated Jan. 24, 2022.
Korean Intellectual Property Office, Non-Final Office Action for Application 10-2019-7028549 dated May 24, 2022.

* cited by examiner

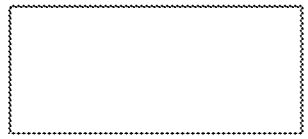 10 MAXIMUM 0.02 INCH TEAR LENGTH

 9 0.02 - 0.06 INCH MAXIMUM TEAR LENGTH AND NOT MORE THAN 1% AREA LOSS

 8 0.06 - 0.12 INCH MAXIMUM TEAR LENGTH AND NOT MORE THAN 5% AREA LOSS

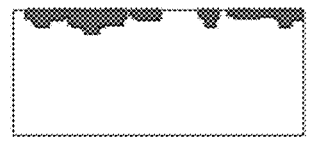 7 0.12 - 0.25 INCH MAXIMUM TEAR LENGTH AND NOT MORE THAN 10% AREA LOSS

 6 0.25 - 0.5 INCH MAXIMUM TEAR LENGTH AND NOT MORE THAN 25% AREA LOSS

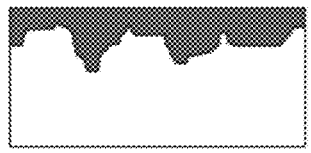 5 25 PERCENT LOSS OF COATING OR MAXIMUM 0.75 INCH LOSS LENGTH

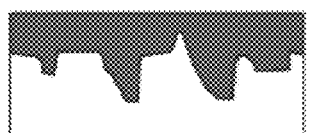 4 40 PERCENT LOSS OF COATING OR LOSS BEYOND 0.75 INCH ANY LOCATION

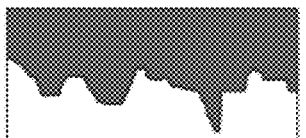 3 50 PERCENT LOSS OF COATING

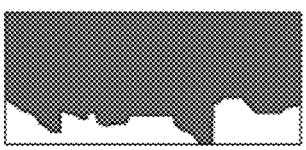 2 75 PERCENT LOSS OF COATING

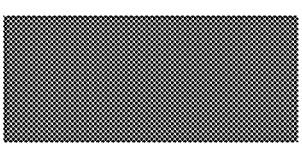 1 100 PERCENT LOSS OF COATING

FIG. 2

| | | |
|---|---|---|
| AT-1 MODIFIED WITH 0.005% SPECIAL BLACK 100 70F, 12-14% RH: (3.0 TO 3.5 mb) | AT-1 MODIFIED WITH 0.005% SPECIAL BLACK 100 70F, 12-14% RH: (3.0 TO 3.5 mb) | AT-1 MODIFIED WITH 0.01% SPECIAL BLACK 100 70F, 12-14% RH: (3.0 TO 3.5 mb) |

FIG. 4
CONTINUED

| | | |
|---|---|---|
| 600<br>600<br>600<br>600 | 600<br>600<br>600<br>600 | |
| UNTREATED<br>68F, 43% RH (10.1 mb) | AT-1<br>68F, 43% RH (10.1 mb) | |
| 600<br>600<br>600<br>600 | 600<br>600<br>600<br>600 | 600<br>600<br>600<br>600 |
| AT-1 MODIFIED WITH<br>0.005% SPECIAL BLACK 5<br>68F, 43% RH (10.1 mb) | AT-1 MODIFIED WITH<br>0.01% SPECIAL BLACK 5<br>68F, 43% RH (10.1 mb) | AT-1 MODIFIED WITH<br>0.05% SPECIAL BLACK 5<br>68F, 43% RH (10.1 mb) |

FIG. 5

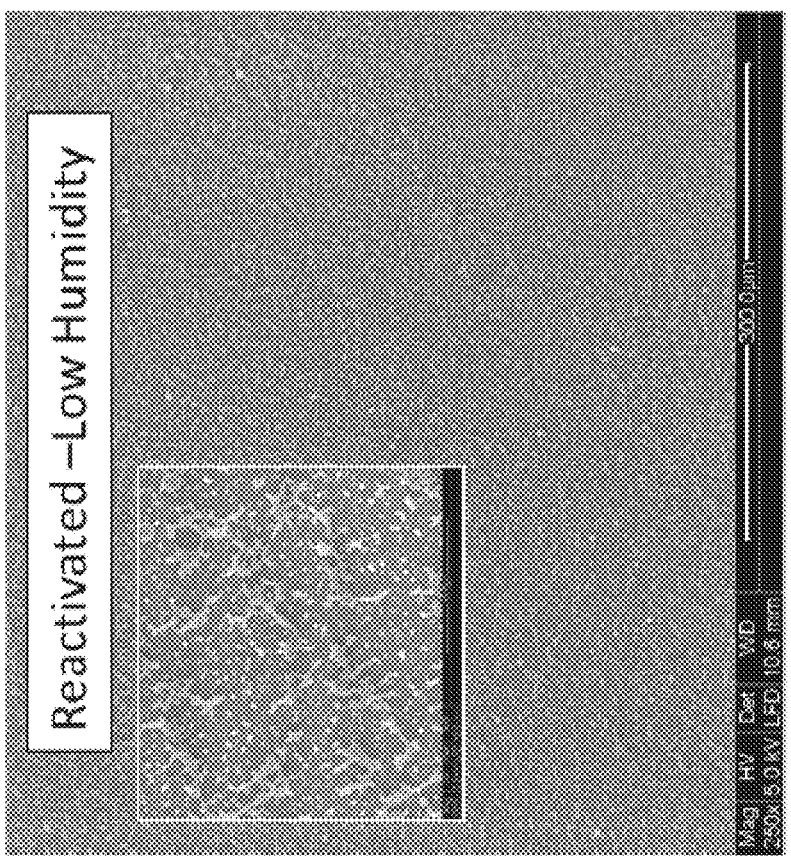
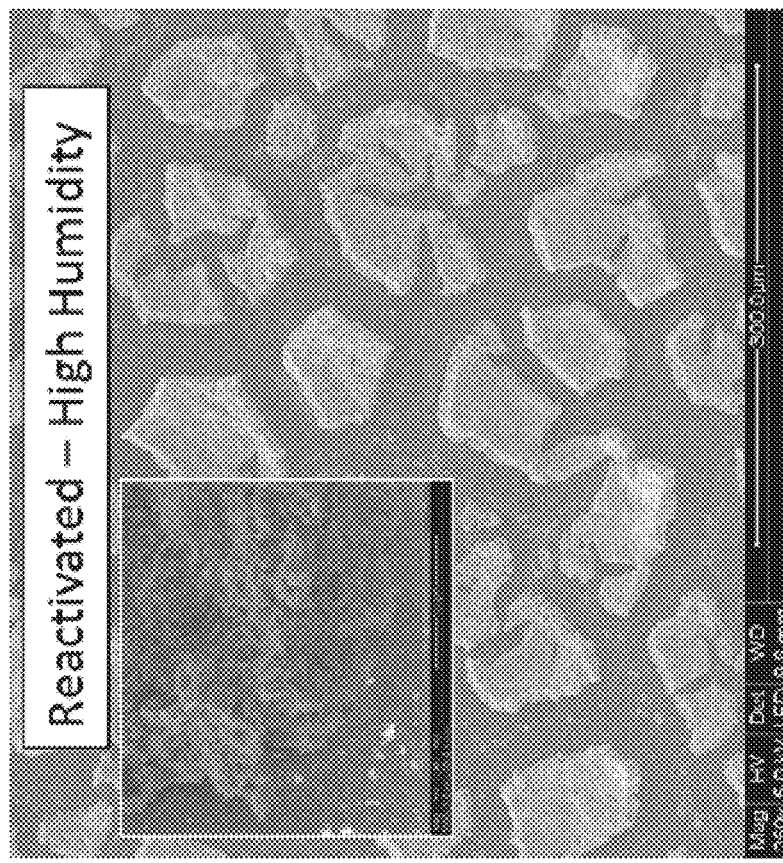
FIG. 7

| | |
|---|---|
| 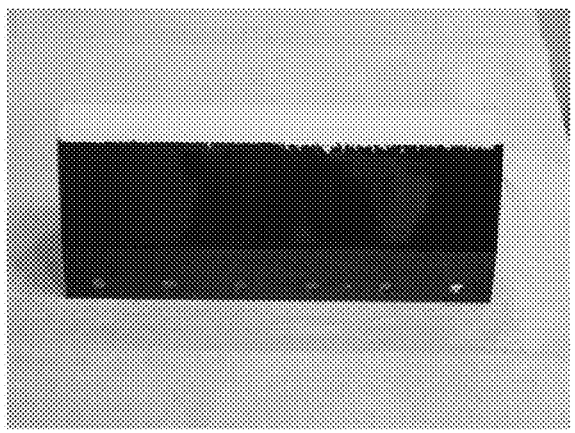<br>EXAMPLE 11, TABLE 2<br>0.1% <50nm ALUMINUM OXIDE IN AT-1 | 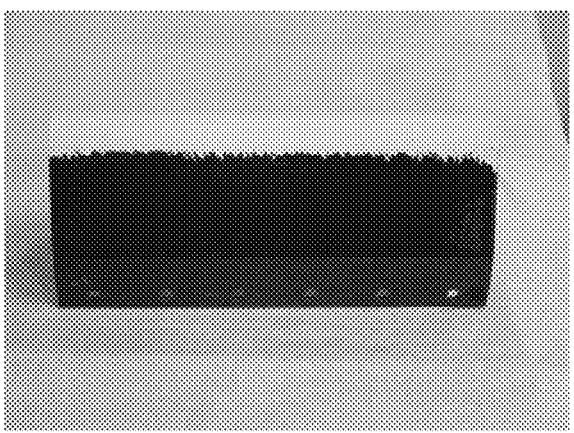<br>EXAMPLE 8, TABLE 2<br>0.5% <50nm ALUMINUM OXIDE IN AT-1 |
| 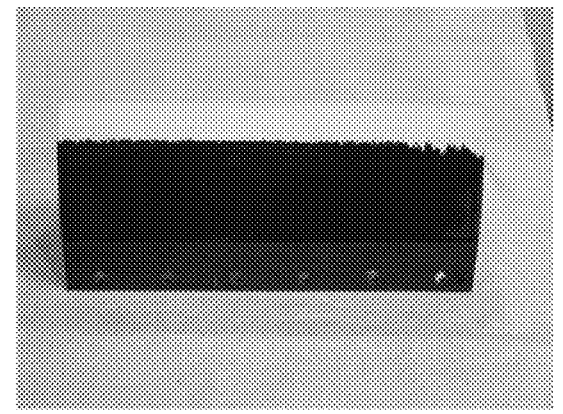<br>EXAMPLE 13, TABLE 2<br>0.5% 160nm SILICON OXIDE IN AT-1 | |
*PER STANDARD TEST PROTOCOL, THE LAST 0.25 INCH OF EACH END OF THE FOILS IS NOT USED IN THE TEAR EVALUATION DUE TO END EFFECTS AND HANDLING DURING TEST PREPARATION.
FIG. 13

SURFACE REACTIVATION TREATMENT

CROSS-REFERENCE TO RELATED APPLICATIONS

The present application claims priority from U.S. Provisional Patent Application No. 62/466,659 filed on 3 Mar. 2017, the content of which is incorporated herein by reference.

FIELD

The present disclosure relates to a method of reactivating the surface of an organic paint coating, a method of facilitating adhesion of a further coating to the organic paint coating, and a rigid substrate having a reactivated organic paint coating.

BACKGROUND

Coatings are generally used to protect the surface of materials from incidental damage, abrasion, chemical attack, corrosion, ultraviolet radiation or in-service degradation. Coatings are also used to enhance the aesthetics and/or optical properties of an object or component. For aircraft coatings, specific coating performance requirements are particularly severe. For example, the coatings must withstand chemical attack from aviation hydraulic fluids that are phosphate ester based for fire resistance. The airframe must be protected against corrosion for at least 25 years. Ultraviolet radiation can be up to 4 times more intense at 40,000 feet cruise altitude than on the ground, and the service environment for the coating is typically from −55 to −60° C. at a typical cruise temperature to 180° C. near hot air exhaust ducts. Since air sticks at the surface of the paint and results in adiabatic heating, the actual skin temperature in cruise can be around −15 to −25° C. Examples of protective and decorative test requirements are given in SAE AMS 3095A.

The surface properties of many coatings dramatically change on drying, curing and/or aging to become more inert than might be predicted based on the chemistry of their individual components alone. Whilst this phenomenon in part provides the coating with chemical resistance, impact strength, abrasion resistance and durability, it also complicates the process of applying further coatings, particularly when they are not applied within a predetermined application window. The same problem arises with applying other entities such as sealants, pin hole fillers and surfacers such as those used on composite substrates, and decals and logos applied with pressure sensitive adhesives, to such coatings. Reactivating adhesion of a previously painted organic coating on a rigid substrate such as an aircraft body or airframe and adhering a new coating to the previously cured or aged painted substrate requires not only reactivating adhesion of the original paint coating to the further coating but also requires not damaging the integrity of the original adhesive connection between the substrate (e.g. body panel) and original coating. The reactivation method should also not damage or degrade the substrate itself if accidental exposure to the substrate occurs.

In cases which require the application of further coating(s) and/or other entities, mechanical abrasion or a chemical or ablative, such as laser, stripping process of the coating is generally necessary before the application procedure of the further coating can take place.

In the specific example of aircraft coatings, the finishing process for the exterior decorative livery of commercial airplanes involves multiple steps starting with surface preparation of the substrate and ending with livery application. Multi-color liveries are produced by consecutively masking out designs with tape or premask and then application of a design color. Typically, the first color down, or body color, will be spray-applied to cover from one-half to all of the fuselage and empennage and then cured. Subsequent design colors are applied, generally on top of the body color, and need to be cured prior to application of additional colors. The total number of cure cycles can range from three for simple designs to six or more for complex designs. The cured topcoat, once it has gone through more than one cure cycle typically above about 35° C. but below 50° C. or has cured at ambient conditions for several hours, may no longer be active towards bonding freshly applied topcoat. Proper surface preparation of each cured topcoat layer prior to application of the next is critical for ensuring adequate adhesion in service, as the stresses experienced by leading edges of aerospace paint layers are quite severe due to impacting rain drops during flight. The cured topcoat must therefore be reactivated to ensure good intercoat adhesion. Monocoats will typically need reactivation after two heat cure cycles above about 40° C. or ambient temperature of 48 hours, where ambient temperature means 10 to 35° C. In basecoat-clearcoat paint systems, basecoat colors are cured at ambient temperature but reactivation is still needed between many of the basecoat colors in complex designs due to the number of colors involved and the length of time it takes to mask, apply, and cure each color. Reactivation prior to clearcoat application is almost always needed due to the length of time needed to create the decorative design with the basecoat colors and for some basecoat colors in some basecoat-clearcoat systems reactivation is needed in as few as two to four hours after basecoat application. Additionally, the reactivation treatment should not alter the color of the basecoat as any change in color will show through the clearcoat and affect the aesthetics of the design.

To prevent de-bonding, cured paint layers have traditionally undergone mechanical abrasion by sanding prior to application of further coatings. However, the sanding process is ergonomically undesirable to the painter, adds flow time, and produces dust. Sanding is difficult to apply uniformly, especially with designs, signboards, or stencil letters involving small radii of curvature and affects the gloss and may shift the color of the abraded coating. Additionally, the small radii of curvature in some designs may necessitate a paint application sequence for topcoats which is less than optimum for flow time. Abrasion may alter the color of a basecoat even after the subsequent clearcoat is applied and sanding cannot be used on special effect paints containing micas or metallic particles.

A spray-applied chemical reactivation method has previously been described in U.S. patent application Ser. No. 11/784,534. Reactivation using this method showed improved adhesion over no reactivation and similar to mechanical abrasion, but can lose some effectiveness at lower humidity. Humidity is not economical to control due to the large volume of a paint hangar, which can exceed 10000 cubic meters, needed to hold a commercial airplane. The hangars will sometimes attempt to raise the humidity by spraying water on the floor, but this is not a robust approach and is not always sufficient so at low humidity, the conventional method for reactivating coatings is by mechanical abrasion. However, as previously mentioned, the use of mechanical abrasion is problematic for a variety of reasons including ergonomics, process flow time, appearance, and consistency.

Consequently, there is a need to extend the application window to low humidity conditions such that the number of days per year that the chemical reactivation method can be more viably used would be increased. In addition, there is a need to make chemical reactivation as robust and as durable as possible to make this process more broadly appealing for environmental conditions found globally, which is relevant for after-market, depot, rework and touch-up operations as well as non-aerospace applications.

SUMMARY

In an aspect, there is provided a method of reactivating a surface of an organic paint coating present on a substrate to facilitate adhesion of a further coating to the organic paint coating, the method comprising applying a surface reactivation treatment comprising or consisting of a solvent, a surface exchange agent, nanoparticles and an optional additive to the organic paint coating, wherein one or more of the components of the reactivation treatment are applied simultaneously, sequentially or separately to the organic paint coating, and wherein the surface exchange agent is selected from at least one of a titanate, zirconate and chelates thereof.

In another aspect, there is provided a method of facilitating adhesion of a further coating to an organic paint coating present on a substrate comprising applying a surface reactivation treatment comprising or consisting of a solvent, a surface exchange agent, nanoparticles and an optional additive to the organic paint coating to reactivate a surface of the organic paint coating to increase adhesion of the surface to a further coating, wherein one or more of the components of the reactivation treatment are applied simultaneously, sequentially or separately to the organic coating, and wherein the surface exchange agent is selected from at least one of a titanate, zirconate and chelates thereof.

In a further aspect, there is provided a surface treatment formulation for reactivating the surface of an organic paint coating present on a substrate to facilitate adhesion of the organic paint coating to a further coating, wherein other than incidental impurities the formulation comprises or consists of;
  (a) a surface exchange agent selected from at least one of a titanate, zirconate and chelate thereof;
  (b) a solvent;
  (c) nanoparticles;
  (d) optionally an additive present in an amount of less than about 10 weight % based on the total weight of the formulation.

In an aspect, the formulation comprises or consists of:
  (a) the surface exchange or transesterification agent present in an amount of less than about 8 weight %;
  (b) the solvent present in an amount of at least about 85 weight %;
  (c) nanoparticles present in an amount of less than about 2 weight %; and
  (d) optionally an additive present in an amount of less than about 10 weight %; wherein the weight % of each of components (a)-(d) is based on the total weight % of the formulation and the total weight % for components (a)-(c), when an additive is not present, or the total weight % for components (a)-(d), when an additive is present, is 100.

In a further aspect, there is provided a substrate having an organic coating wherein the surface of the organic coating has been reactivated to facilitate adhesion of the coating to a further coating by applying a reactivation treatment according to the first or second aspects, or any aspect thereof as described herein, to the organic coating wherein one or more of the components of the reactivation treatment are applied simultaneously, sequentially or separately of the organic coating, or by applying a surface treatment formulation according to the third aspect, or any aspects thereof as described herein.

In an aspect of the further aspect, the substrate is a substantially inelastic panel. In another aspect, the substrate is a metal, metal alloy or composite material.

In other aspects of any of the above aspects, the further coating may be an organic coating, such as an organic paint coating.

It will be appreciated that further aspects are described herein, which may include one or more of the features as described above.

DETAILED DESCRIPTION

Various methods have been developed by the present inventors that allow an effective reactivation of an existing organic paint coating present on a rigid substrate to be performed over a broad application window, which includes low humidity, for example below about 5 millibar (mb) partial water vapor pressure, to improve adhesive properties of the existing organic paint coating toward further organic coatings of the same or different type and/or other entities. The methods including reactivation treatments can be used without compromising coating integrity between the existing organic paint coating and the substrate or by affecting or having an effect on the underlying substrate if, for example, areas of the substrate not containing an existing coating are directly contacted with the reactivation treatment. It would be appreciated that affecting or having an effect on the substrate generally means that there is no reduction in integrity, mechanical strength, or swelling of the substrate such that it might impact on desired performance properties. The method is also suitable for reactivating adhesive properties of organic coatings at higher humidity environments, for example above about 5 mb partial vapor water pressures. The methods including reactivation treatments can be used on cured, aged or in-service organic paint coatings (which are already adhered to substrates), for example when such organic paint coatings have exceeded an application window where adhesion of further organic coatings over the existing organic paint coatings will not meet in-service performance requirements. As used herein, an "existing organic coating" is an organic coating that has already been disposed on a substrate.

Applying a further organic coating to a previously painted surface has generally required a harsh surface stripping process such as mechanical abrasion (e.g. sanding) or ablative (e.g. laser) to the organic paint coating before the further organic coating can be applied. Advantageously, the present disclosure provides a method that no longer requires traditional methods of mechanical abrasion or chemical stripping of an organic coating before applying a subsequent coating and/or other entities. For example, the reactivation treatment can reactivate the surface of the organic coating to improve its adhesive properties towards further coatings and/or other entities. However, the method may also be used in conjunction with traditional methods. For example, it may be advantageous to also use mechanical abrasion to locally remove a contaminant such as a grease or oil residue.

As shown in FIG. 1, reactivating adhesion of a previously applied organic paint coating (2) on a rigid substrate (1), such as an aircraft body, panel or airframe, and adhering a new coating (4) with an effective adhesive connection (5) to the previously cured, aged or in-service painted substrate requires not only reactivating adhesion of the original coating (2) to the further coating (4) but also requires not affecting the integrity of the original adhesive connection (3) between the substrate (1) and original coating (2) nor directly on any exposed (uncoated) substrate (6) on which the original coating resides.

The methods of the present disclosure include reactivating the surface of an organic paint coating present on a substrate so as to activate or enhance the adhesive properties of the organic paint coating towards further coating(s), such as further organic coatings. The term 'reactivating' is used in this context to mean the improvement of the adhesive properties of the organic paint coating relative to the adhesive properties of that organic paint coating, prior to application of the reactivation treatment or the components thereof.

Reactivation Method

Reactivation methods of the present disclosure involve applying the reactivation treatment, or individual components of the reactivation treatment, to a surface of an organic paint coating already present on a substrate. For example, where the organic paint coating has been previously adhered to a substrate and aged beyond its application window for adhering further coatings or other entities without the need for specific reactivation of adhesion (e.g. harsh surface treatments such as mechanical abrasion). The organic paint coating present on a substrate is aged such that without reactivation treatment (e.g. mechanical abrasion), adhesion of a further coating to the organic paint coating would not meet in-service performance requirements. For example, the organic paint coating already present on the substrate, and to which a further coating is to be applied, is not a freshly applied organic paint coating that is still within an application window of being receptive to adhering a further coating.

It will be appreciated that the above mentioned application window provides an environmental duration such that any freshly applied organic paint coating is aged past its acceptable adhesion window for applying any further coatings such that its adhesion would not meet in-service performance requirements, for example a duration of time following curing of the organic paint coating present on the substrate such that adherence of a further coating would be unsatisfactory for performance requirements. The organic paint coating already present on a substrate can be a post-cured, aged or in-service coating. An in-service coating will be understood to be a coating that has been previously applied and is suitable for in-service use or has actually been used in service, for example an aerospace panel that has been provided on an aircraft where the aircraft has been flown at least once. The application window may depend on the type of organic paint coating and type of substrate, and may involve considerations of time, humidity, temperature, pressure, type of UV exposure, or other curing process, for example. The application time window for post-cured, aged or in-service organic paint coatings may for example be 30 mins, 1 hour, 2 hours, 4 hours, 8 hours, 16 hours, 24 hours, 2 days, 1 week, 2 weeks, or 4 weeks or more. The application window for in-service use may also involve a predetermined time of exposure to high altitude atmospheric conditions (e.g. greater than 10,000 feet) for in service aircraft, for example, of 1 hour, 10 hours, 100 hours, or 1000 hours.

Reactivation methods of the present disclosure are chemical methods of modifying the surface of the organic paint coating so that the surface is more receptive to forming adhesive interactions with further coatings. Without wishing to be limited by any theory it is believed that the interaction of the solvent, agent, nanoparticles and optional additive(s) with the organic paint coating modifies the coating surface chemistry and/or surface topography to enable it to be more receptive towards other entities including but not limited to further coating(s). The solvent, agent, nanoparticles and optional additives are chosen such that the bulk integrity of the organic paint coating and any underlying coating and substrate structures are maintained, and can further include consideration of compatibility with the substrate in case of any incidental exposure of any uncoated substrate surface to the reactivation treatment.

The reactivation treatment, or one or more of the components thereof, may be applied via any liquid application method known to those skilled in the art such as but not limited to spray, brush, dip, knife, blade, hose, roller, wipe, curtain, flood, flow, mist, pipette, aerosol or combinations thereof. In one aspect, the application is by spray, for example the reactivation treatment may be a reactivation treatment spray formulation.

The method of reactivation as presently disclosed herein may be conducted at ambient temperatures, for example ranging from about 10 to 35° C. The method of reactivation may also be conducted generally around typical atmospheric pressures (e.g. between about 90 and 105 kPa, and more typically about 101 kPa). The reactivation treatment to an organic coating and/or curing of the further coating may occur at ambient temperature. For example, ambient temperature may be between 15 and 30° C., or 20 to 25° C. Application of the reactivation treatment does not require pre-heating of the coated substrate. Heat curing of the further coating may also not be required due to the reactivation treatment, although heat curing may be provided depending on any further advantages that might be obtained from the development of chemical and physical bulk properties in the further coating.

Reactivation methods of the present disclosure are also suitable for use in environments with low humidity. The term "low humidity" refers to the humidity at which the reactivation treatment is applied and not the humidity at which curing of the further coating takes place. Low humidity in this instance means partial water vapor pressures of less than about 5 mb. At about 21° C., this corresponds to a relative humidity of around 20% or less. Relative humidity is defined as follows.

$$\text{Relative Humidity} = \frac{\text{Actual vapor pressure}}{\text{Saturated vapor pressure}} \times 100\%$$

Saturated vapor pressures for water are well known and change depending on the temperature (Donald Ahrens, 1994, *Meteorology Today—an introduction to weather, climate and the environment* Fifth Edition—West Publishing Co). As a consequence, the water vapor pressure will change with temperature for a given relative humidity. An illustration of this is provided below (http://ww2010.atmos.uiuc.edu/%28Gh%29/guides/mtr/cld/dvlp/rh.rxml, downloaded December 2014).

| Temperature (° C.) | 20% Relative Humidity Partial Water Vapor Pressure (mb) | 80% Relative Humidity Partial Water Vapor Pressure (mb) | 100% Relative Humidity Saturated Water Vapor Pressure (mb) |
| --- | --- | --- | --- |
| 10 | 2.5 | 9.8 | 12.3 |
| 15 | 3.4 | 13.6 | 17.1 |

-continued

| Temperature (° C.) | 20% Relative Humidity Partial Water Vapor Pressure (mb) | 80% Relative Humidity Partial Water Vapor Pressure (mb) | 100% Relative Humidity Saturated Water Vapor Pressure (mb) |
|---|---|---|---|
| 20 | 4.7 | 18.7 | 23.4 |
| 25 | 6.3 | 25.4 | 31.7 |
| 30 | 8.5 | 34.0 | 42.5 |
| 35 | 11.3 | 45.0 | 56.3 |

While the application of the reactivation treatment is effective for use in environments with low humidity, and wherein other treatments may not be effective, reactivation treatments of the present disclosure are also effective at a higher humidity. In other words, one of the advantages of the present reactivation treatment is that it can be used across a relatively broad application window (e.g. combination of broad parameters of temperature, pressure and humidity), and in particular across a broad humidity range, even though a further particular advantage is its use at low humidity.

The reactivation treatment may, for example, be performed at a relative humidity of less than about 90%, 80%, 70%, 60%, 50%, 40%, 30%, 20%, 18%, 16%, 14%, 12%, 10%, 8%, 6%, 4%, or 2%. The reactivation treatment may be performed at a relative humidity of greater than about 1%, 2%, 4%, 6%, 8%, 10%, 12%, 14%, 16%, 18%, 20%, 30%, 40%, 50%, 60%, or 70%. The reactivation treatment may be performed at a relative humidity of between any two of these values, for example between about 1% and about 90%, about 2% and about 50%, about 10% and about 70%, about 2% and about 30%, about 1% and about 20%, or about 4% and about 18%. It will be appreciated that the relative humidity for a given partial water vapor pressure depends on temperature. The partial water vapor pressure and temperature are independent variables and relative humidity (RH) is a dependent variable although there is a constraint that the relative humidity cannot exceed 100% at any particular temperature. For example, any one or more of the above relative humidity values may be provided where the temperature is between about 10 to 35° C., between about 15 and 30° C., or between about 20 to 25° C. The above relative humidity values may for example be where the temperature is at value of about 15° C., 16° C., 17° C., 18° C., 19° C., 20° C., 21° C., 22° C., 23° C., 24° C., 25° C., 26° C., 27° C., 28° C., 29° C., or 30° C. The application window for the reactivation methods as presently disclosed may be any combination of the above RH and temperature ranges or values. For example, the application window may be where the RH is between about 10% and about 70% and a temperature range between about 15° C. and about 30° C. The application window may for example be at least about 10% RH at a temperature between about 15° C. and about 30° C. The application window may for example be less than about 70% RH at a temperature between about 15° C. and 30° C.

The humidity may be provided by a partial water vapour pressure (in mb) of less than about 60, 50, 40, 30, 20, 15, 14, 13, 12, 11, 10, 9, 8, 7, 6, 5, 4, 3, or 2. The humidity may be provided by a partial water vapour pressure (in mb) of more than about 1, 2, 3, 4, 5, 6, 7, 8, 9, 10, 11, 12, 13, 14, 15, 20, 30, 40, 50, 60. The humidity may be provided by a partial water vapour pressure (in mb) between any two of these values, for example between about 1 and about 50, such as about 2 and about 25, such about 3 and about 15, such as about 4 and about 10. The humidity may be provided by a given temperature according to a temperature value or range as described above, although it will be appreciated that the temperature values are such that the humidity does not exceed 100% relative humidity or its partial vapour pressure does not exceed its saturated vapour pressure. The relative humidity at a given temperature for any of these partial water vapour pressure values may for example be less than about 90%, 80%, 70%, 60%, 50%, 40%, 30%, or 20%. A relative humidity of less than about 90% or lower can assist to prevent or reduce surface condensation.

The reactivation treatment, or one or more components thereof, may be applied to small or large areas, to sections of larger parts, components or full infrastructure such as infrastructure associated with the aerospace (e.g. aircraft), automotive (e.g. vehicles), marine (e.g. ships), transportation (e.g. trains), military (e.g. helicopter, missile) or construction industries (e.g. buildings, factories, floors). The surface may have simple or complex geometry or may be at any orientation. Treatment may be conducted once or multiple times prior to interaction with the further coating and/or other entities. The exposure time of the reactivation treatment on the organic coating is more limited by the throughput and application requirements. As such the exposure time may be short, for example five minutes, or extended to 24 hours, with no detriment to the integrity of the organic coating or materials that may be found on the organic coating such as sealants and underlying coating structures and substrates. In one aspect, the exposure time should be sufficient for solvent evaporation and the treatment should be visually dry. This will depend on airflow and the temperature of the environment wherein the reactivation treatment is applied. It will also be appreciated that as the relative humidity approaches 100%, the application window for applying a further coating reduces to, for example, less than about 15 minutes.

The reactivation treatment may contain optional additives, for example, to modify the drying time, or reduce corrosion. Such additives include but are not limited to anticorrosion additives and colorants such as dyes and pigments. The additive may be a colorant such as a dye, for example a UV fluorescent dye to indicate where the activator has been sprayed. It will be appreciated that these additives are optional and are not essential to the reactivation treatment for activating adhesion. For example, the additives, if present, do not contribute to surface reactivation, or are not chemically reactive with the surface of the organic paint coating. The optional additives are described in further detail below under the section "Optional Additives".

After the organic coating surface is reactivated, a further coating may be applied either immediately or at a delayed time, providing the surface remains predominantly uncontaminated. The further coating may include entities such as adhesives, sealants, pinhole fillers, stencils, signboards, pressure sensitive decals or logos.

Any suitable method known to those skilled in the art may be used to assess whether the adhesive linkage between the organic coating and further coatings and/or other entities is fit for purpose, or the adhesive linkage between the organic coating and the substrate (or coating therebetween) is a cured, aged or an in-service substrate having an organic paint coating as described above. Such tests include but are not limited to ASTM, ISO, or SAE standards, in-house test methods to simulate in-service performance, in-service performance itself, and durability testing either actual or accelerated. In the case of aerospace coatings, test methods based on water impact, such as whirling arm rain erosion and the Single Impact Jet Apparatus (SIJA) (MIJA Limited, Cambridge, UK) at an immersion time from 16 to 24 hours have been used, and whirling arm rain erosion has been found to be particularly useful for assessing intercoat adhesion for aerospace coatings. In these cases, the degree of overcoat removal is related to the level of intercoat adhesion and simulates the effect of rain erosion observed on commercial airplanes. Typically, these two tests provide more differentiation in adhesive linkages for aerospace coatings than other test methods. These methods have been described in the reference, Berry D. H., and Seebergh J. E., "Adhesion Test Measurement Comparison for Exterior Decorative Aerospace Coatings: Two Case Studies", Proceedings 26th Annual Adhesion Society Meeting, Myrtle Beach, S.C., pp 228-230 (2003).

For rain erosion testing, % area removal or longest tear length of an overcoat after exposure to a simulated rain field for 30 minutes can be used to determine the degree of intercoat adhesion between overcoat and underlying coating, and this can be quantified by image analysis including visual inspection or measurement. For example, initially the length of the longest tear is first measured and as needed the level 5 scale area removed is then determined. FIG. 2 highlights visual representations relating to a scale of 1 to 10 corresponding to maximum tear length and % area of coating removed under rain erosion testing. For example, in FIG. 2, a level 6 scale value is equivalent a 0.5 inch maximum tear length and also less than 25% area removed, a level 7 is a 0.25 inch maximum tear length and also less than 10% area removed, a level 8 is a 0.12 inch maximum tear length and less than 5% area removed. Depending on various factors including the types of coatings used, the methods of the present disclosure may provide a scale rating of 10, 9, 8, 7, 6, 5, 4, 3, or 2. In one aspect, the scale rating is at least 7. Depending on various factors including the types of coatings used, the methods of the present disclosure may provide a rain erosion testing value corresponding to the % area removed of less than about 1, 2, 3, 4, 5, 6, 7, 8, 9, 10, 15, 20, 25, 30, 40, 50, 60, 70, 80, or 90%. Further, methods of the present disclosure may provide a rain erosion testing value corresponding to tear length that is less than about 1 inch tear length, such as less than about 0.5 inch tear length, such as less than about 0.25 inch tear length, such as less than about 0.12 inch tear length, such as less than about 0.06 inch tear length, for example about 0.02 inch tear length. It will be appreciated that the more overcoat removed corresponds to inferior inter-coat adhesion.

Single Impact Jet Apparatus (SIJA, Cambridge) testing may be with equipment configured using a 0.8 mm nozzle and 0.22 calibre 5.5 mm Crosman Accupell Pointed Pellets (#11246). Testing can involve immersion in water for about 16 to 18 hours and using a 45° specimen to impact droplet geometry. A single water jet can be used with impact velocity of about 600+25 m/s.

Rain erosion testing can use a whirling arm rain erosion apparatus employing a 1.32 m (52 inch) zero lift helicopter like propeller run at 3600 rpm. Overcoats (e.g. further coating on an organic paint coating) can be applied at 80 to 120 microns of paint thickness with masking to produce a leading edge. A velocity of about 170 ms$^{-1}$ can be provided at the midpoint of a testing sample. An effective rain field density can be about 2 mm droplets corresponding to about 2.54×10$^{-5}$ kmh$^{-1}$ (1 inch per hour). The impact of rain erosion can be determined after 30 minutes testing and the inter-coat adhesion of the samples evaluated according to the amount of paint removed or tear lengths as described above.

The adhesive linkage between the organic paint coating and the substrate (or layer therebetween), or adhesive linkage between the organic paint coating and the further coating, may also be determined by other methods such as a wet and dry cross-hatch scribe test, particularly for applications outside aerospace coatings. Dry adhesion of the coatings may be determined according to ASTM D3359, Standard Test Methods for Measuring Adhesion by Tape Test, Test method B. A crosshatch pattern can be scribed through each coating composition down to the substrate. A strip of 1 inch wide masking tape, such as 3M type 250, can then be applied. The tape can be pressed down using two passes of a 4.5-pound rubber covered roller. The tape can then be removed in one abrupt motion perpendicular to the panel. The adhesion can then be rated by a visual examination of the paint at the crosshatch area to determine % area of removal of the coating as described above.

At least according to some aspects, the methods as disclosed herein may provide further coatings to organic paint coatings (already present on the substrate) that provide resistance to aggressive solvents and aeroplane fluids. For example, resistance to hydraulic fluids. Hydraulic fluids for aerospace application typically include phosphate esters for fire resistance properties, which are very aggressive towards many plastics and finishes. Particularly for aerospace applications, exterior decorative coatings should retain sufficient pencil hardness after a 30-day ambient soak in BMS3-11 hydraulic fluid. The pencil hardness, before and/or after hydraulic fluid testing, for organic paint coated substrates, or further coated substrates thereof, may be at least 2B, 3H, 4H, 5H, 6H, 7H, or 8H.

For aerospace applications, reactivation methods of the present disclosure can offer advantages of improved flow time for the process of reactivation, greater reproducibility and consistency over larger areas and between operators, and improved ergonomics of the process which added together provide a net cost saving.

The method of the present disclosure involves facilitating adhesion of the further coating and/or other entities to an organic paint coating present on a substrate comprising applying a surface reactivation treatment comprising or consisting of a solvent, a surface exchange or transesterification agent, nanoparticles and an optional additive to the organic paint coating to reactivate the surface of the organic paint coating to increase adhesion of the surface to the further coating and/or other entities. The combination of the solvent(s), surface reactivation agent (i.e. titanate, zirconate and chelates thereof) and nanoparticles may disrupt the surface of the cured, aged or inert organic paint coating such that it is activated for adhesion, for example to adhere a further coating to provide effective adhesion for in service performance, such as the aerospace ASTM intercoat adhesion properties as described herein. Optional additives as described herein may be used to provide additional advantages, such as providing coloration or anticorrosion properties in addition to the reactivation of adhesion properties provided by the combination of solvent(s), surface exchange agent(s) and nanoparticles.

Following the application of the surface reactivation treatment to the surface of the organic paint coating, the method may further comprise one or more optional steps including at least one of drying, cleaning and wiping the surface of the organic paint coating. In one aspect, the method comprises drying the previously reactivated surface of the organic paint coating prior to application of the further coating and/or other entities. The drying step may be for at least 15 minutes, 30 minutes, 60 minutes, 1 hour, 2 hours, 4 hours, 8 hours, or 1 day, or for any time interval of any of those durations, for example 30 minutes to 1 day. The method may further comprise pre-treatment steps before the reactivation treatment step. For example, before the surface reactivation treatment is applied, one or more pre-treatment steps may comprise or consist of non-reactivation steps such as prior cleaning, which may include mechanical abrasion to remove isolated surface contaminants or washing steps. It will be appreciated the pre-treatment steps may exclude any one or more other surface reactivation steps, such as corona discharge.

There may be provided a method of reactivating the surface of an organic paint coating present on a substrate to facilitate adhesion of the organic paint coating to a further coating, whereby the method comprises or consists of:

optionally prior cleaning the surface of the organic paint coating present on the substrate;

applying a surface reactivation treatment comprising or consisting of a solvent, a surface exchange agent, nanoparticles and an optional additive to the organic paint coating, wherein the surface exchange agent is selected from at least one of a titanate, zirconate, and chelates thereof;

optionally at least one of drying, cleaning and wiping the surface of the organic paint coating; and optionally applying one or more further coatings to the reactivated surface of the organic paint coating.

It will be appreciated that one or more steps of the process may be repeated to provide further coatings to the previously coated substrate. It will also be appreciated that any further aspects described herein may also apply to the above method.

There may be provided a method of further coating an organic paint coating present on a substrate, the method comprising or consisting of:

applying a surface reactivation treatment to the organic paint coating present on the substrate to facilitate adhesion of a further coating to the organic paint coating, the surface reactivation treatment comprising or consisting of a solvent, a surface exchange agent, nanoparticles, and an optional additive to the organic paint coating present on the substrate, wherein one or more of the components of the reactivation treatment are applied simultaneously, sequentially or separately to the organic paint coating, wherein the surface exchange agent is selected from at least one of a titanate, zirconate, and chelates thereof; and applying the further coating to the surface of the organic paint coating.

It will also be appreciated that one or more steps of the process may be repeated to provide further coatings to the previously coated substrate, and any further aspects described herein may also apply to the above method.

Organic Paint Coating

The word "organic paint coating" is used herein in its broadest sense and describes decorative topcoats; undercoats; intermediate coatings; primers; sealers; lacquers; coatings which are pigmented or clear; coatings designed for specific purposes, such as, corrosion prevention, temperature resistance, or camouflage; coatings which are high gloss, matte, textured, or smooth in finish; or coatings containing specialty additives, such as metal flakes. It is applied in a liquid, liquefiable, or mastic composition that, after application to a substrate in a thin layer, converts to a solid film. For example, the organic paint coating may be a basecoat and the further coating may be a clearcoat to provide a basecoat-clearcoat (BCCC) system.

As discussed above, organic paint coatings that are cured, dried or aged beyond a certain time period often develop resistance to forming strong adhesive linkages towards other entities, such as further layers. Their surface properties become more inert than might be predicted, based on the chemistry of their individual components alone. Without wishing to be limited by any theory, it is believed that this phenomenon may result from a reduction in coating surface energy and amount of reactive surface functional groups in conjunction with a higher cross-link density as a function of cure time/aging which can reduce chemical interaction and/or the formation of strong adhesive linkages with other entities.

The organic paint coatings that may be reactivated include, but are not limited to, fully or partially cross-linked organic coatings. Examples of organic paint coatings include polyurethane, epoxy, polyester, polycarbonate and/or acrylic coatings. In one aspect, the organic paint coating is selected from at least one of an acrylic, polycarbonate, polyurethane and epoxy coatings. The organic paint coating may be a polyurethane based paint. Due to their superior mechanical properties and resistance to abrasion, chemical attack, and environmental degradation, such organic paint coatings are widely used to protect infrastructure in the aerospace, automotive, marine, transportation, military and construction industries. Many of these coatings show a marked reduction in adhesion to further coating(s) and/or other entities such as adhesives, sealants, pinhole fillers, stencils, signboards, pressure sensitive decals or logos, with increased time of curing and/or aging.

Although polyurethane and epoxy based coatings are typical and the most commonly used type of coating for aerospace, it will be understood that other organic paint coatings may be reactivated by the method of the present disclosure.

It will be appreciated that the organic paint coating to be reactivated is on a substrate. However, there may also be various "sub" coating(s) beneath the organic paint coating such as other decorative coatings, primers, intermediate layers and conversion or anticorrosion coatings.

Further Coating and/or Other Entities

The further coating may be an organic coating, such as an organic paint coating as described above, or an inorganic coating.

As described above the word "coating" is used herein in its broadest sense and describes decorative topcoats; undercoats; intermediate coatings; primers; sealers; lacquers; coatings which are pigmented or clear; coatings designed for specific purposes, such as, corrosion prevention, temperature resistance, or camouflage; coatings which are high gloss, matte, textured, or smooth in finish; or coatings containing specialty additives, such as metal, mica, or glass flakes. The further coating may be a clearcoat such as for a basecoat-clearcoat (BCCC) system, or may be a transparent coat.

It will be appreciated that the further coating may be the same or different to the organic paint coating.

The other entities may be the same as those described above and may include adhesives, sealants, pinhole fillers, stencils, signboards, pressure sensitive decals or logos.

Solvent in Reactivation Treatment

The solvent may be a single solvent or a combination of two or more solvents. The solvent may be an organic solvent appropriate for industrial use. The solvent(s) may be at least one solvent selected from one or more ester(s), ketone(s), ether(s) and alcohol(s), which may provide further advantages to the reactivation treatment, such as in some aspects facilitating disruption of the surface (or film thereon) of an organic paint coating present on a substrate or by providing an effective carrier for the agents with various vaporisation parameters. The solvent(s) may be at least one solvent selected from one or more ketone(s), ether(s) and alcohol(s), which may provide even further advantages to the reactivation treatment. The solvent(s) may also be effective carriers for the nanoparticles and surface exchange agent(s), for example providing a liquid formulation capable of being effectively spray applied to the surface of an organic paint coating present on a substrate. The solvents may be one or more organic solvents selected from $C_{1-12}$alkyl having one or more (e.g. 1 to 4) functional groups selected from hydroxyl, ether, ketone, and ester. It will be appreciated that the alkyl group is interrupted and/or substituted by the one or more functional groups. The functional groups may be selected from at least one of hydroxyl, ether and ketone. It will be appreciated that the "$C_{1-12}$alkyl" refers to straight or branched chain saturated hydrocarbons having between 1 and 12 carbon atoms that may be substituted and/or interrupted by the one or more functional groups. The solvents may be one or more organic solvents selected from a $C_{3-10}$alkyl interrupted and/or substituted as hereinbefore described. Suitable organic solvents or solvent combinations can provide further advantages, which may depend on the surface exchange agent(s) and nanoparticles employed, and may include but are not limited to:

(a) ketones such as methyl ethyl ketone, methyl propyl ketone, methyl amyl ketone, methyl isoamyl ketone, methyl isobutyl ketone, acetyl acetone and acetone;

(b) alcohols such as aromatic alcohols, for example, benzyl alcohol; aliphatic alcohols, for example, $C_{1-6}$ or $C_{1-4}$ alcohols i.e. tertiary butanol, n-butanol, secondary butanol, isopropyl alcohol, n-propanol, ethanol and methanol; cyclic alcohols, for example, cyclohexanol; and glycols, for example ethylene glycol, polyethylene glycol, diethylene glycol, triethylene glycol, tetraethylene glycol, propylene glycol, dipropylene glycol, tripropylene glycol and polypropylene glycol;

(c) ethers such as glycol ethers, for example, glycol diethers such as the di-$C_{1-6}$ alkyl ethers of glycols including diethers of alkylene glycols for example ethylene glycol, diethylene glycol, triethylene glycol, tetraethylene glycol, polyethylene glycol, propylene glycol, dipropylene glycol, tripropylene glycol and polypropylene glycol including but not limited to diethylene glycol dimethylether, dipropylene glycol dimethyl ether or methyl butylether of diethylene glycol and cyclic ethers such as tetrahydrofuran;

(d) esters such as ethyl acetate, propyl acetate, isopropyl acetate, butyl acetate, isobutyl acetate, tertiary butyl acetate and glycol ether acetates;

or any combinations thereof.

The solvents may be alcohols such as ethanol, methanol, ethoxyethanol, propanol, isopropanol or n-propanol, butanol, tertiary butanol and secondary butanol; and ether solvents such as $C_{1-6}$ alkyl ethers or combinations thereof (i.e. mixed ethers) of ethylene glycols and propylene glycols including but not limited to glyme, diglyme, triglyme, tetraglyme and dipropylene glycol dimethyl ether and cyclic ethers, for example, tetrahydrofuran.

Solvent combinations may be provided including glycol ether:alcohol combinations such as dipropylene glycol dimethyl ether:isopropanol or n-propanol; ether:alcohol combinations such as dipropylene glycol dimethyl ether:isopropanol or n-propanol, methanol, isobutanol, secondary butanol, tertiary butanol, ethoxy ethanol and/or ethylhexanol; ethylene glycol monomethyl ether: ethanol, methanol, ethoxyethanol and/or isopropanol; glycols and monoether combinations such as dipropylenegylcol-monomethylether, dipropylenegylcol-monobutylether, and/or dipropylenegylcol; ether combinations such as tetrahydrofuran:triglyme and tetrahydrofuran:dipropylene glycol dimethylether; solvent combinations comprising ketones such as methyl ethyl ketone, methyl amyl ketone, methyl propyl ketone. Typical solvent combinations include high and low boiling point solvent combinations.

The solvent combination may be an ether:alcohol combination such as glycol ethers for example glycol diethers such as diethers of alkylene glycols including dipropylene glycol diethers for example dipropylene glycol dimethyl ether and alcohols such as aliphatic alcohols for example $C_{1-6}$ or $C_{1-4}$ alcohols such as isopropanol or n-propanol. These solvent combinations may provide even further advantages to the reactivation treatment, such as facilitating disruption of the surface (or film thereon) of an organic paint coating present on a substrate, and may also act as effective carriers for the nanoparticles and surface exchange agent(s), for example providing a liquid formulation capable of being effectively spray applied to the surface of an organic paint coating present on a substrate to provide reactivation of adhesion thereof as described herein.

Solvents may contain less than about 800 ppm of water, for example less than about 700 ppm, 600 ppm, 500 ppm, 400 ppm, 300 ppm, 200 ppm, or 100 ppm water, to reduce or prevent precipitation of the surface exchange agent. Anhydrous forms of the solvents are preferred. No addition of water to the formulation is required. The solvent(s) may be present in an amount (based on the total weight of the reactivation formulation or the components thereof) of less than about 99.5%, 99%, 98%, 97%, 96%, 95%, 94%, 93%, 92%, 91%, 90%, 89%, 88%, 87%, 86%, or 85%. The solvents may be present in an amount (based on the total weight of the reactivation formulation or the components thereof) of greater than about 85%, 86%, 87%, 88%, 89%, 90%, 91%, 92%, 93%, 94%, 95%, 96%, 97%, 98%, or 99%. The solvent may be present in an amount of a range between any two of those values, for example between about 90 and 99.5%, between about 92% and 99%, or between about 94% and 98%. In an aspect, the solvent is present in an amount greater than about 90%, or in an amount of about 95% to about 98% based on the total weight of the reactivation treatment, formulation or the components thereof.

The "solvents" may contain "additional solvent(s)" that may be present with the nanoparticles and/or additive(s) as described below. The above solvents without any "additional solvent" may also be referred to herein as a "formulation solvent". The "solvent" may therefore comprise or consist of a "formulation solvent", optionally "additional solvents", optionally incidental impurities, and optionally small amounts of water as described herein. The "additional solvent(s)" may be provided in an amount (wt % of the total reactivation treatment formulation) is less than about 10, 9, 8, 7, 6, 5, 4, 3, 2, or 1%. In an aspect, the additional solvents are the same as those selected for the formulation solvent. The total amount of "additional solvent(s)" and "formulation solvents" may be provided in the amounts referred to above in relation to "solvent(s)". The "additional solvent(s)" are described further below, particularly with reference to the "nanoparticles" section. For example, the additional solvents may be selected from at least one of an acetate(s) and alcohol(s), such as at least one of methoxy propyl acetate, methoxy propanol, and isopropanol.

Surface Exchange Agent

Suitable agents include those that facilitate surface exchange of the organic coating. Suitable agents that facilitate surface exchange may include transesterification agents. Suitable agents that facilitate surface exchange may be selected from titanates and zirconates, or chelates thereof such as $C_{1-10}$ alkyl titanates, $C_{1-10}$ alkyltitanate chelates, $C_{1-10}$ alkyl zirconates, $C_{1-10}$ alkyl zirconate chelates. Specific examples include tetra-isopropyltitanate, tetra-n-propyltitanate, tetra-n-butyltitanate, tetra-2-ethylhexyltitanate, tetraethyltitanate, tetra-n-propylzirconate, tetra-n-butylzirconate, and combinations thereof.

The agents may be selected from at least one of tetra-n-propylzirconate, tetra-n-butylzirconate, zirconium-n-propoxide, tetra-n-propyltitanate, tetra-isopropyl alcohol, and tetra-n-butyltitanate.

The agents may be a zirconate or chelate thereof, for example selected from a tetra-n-propylzirconate, tetra-n-butylzirconate, and zirconium-n-propoxide.

The agents may be a titanate or chelate thereof, for example selected from tetra-n-propyltitanate, tetra-isopropyl alcohol, and tetra-n-butyltitanate.

The agent(s) may be present in an amount (based on the total weight of the reactivation formulation) of more than about 0.001%, 0.01%, 0.05%, 0.1%, 0.5%, 1%, 2%, 3%, 4%, 5%, 6%, 7%, 8%, 9%, or 10%. The agent(s) may be present in an amount (based on the total weight of the reactivation formulation or the components thereof) of less than about 10%, 9%, 8%, 7%, 6%, 5%, 4%, 3%, 2%, 1%, 0.5%, 0.1%, 0.05%, or 0.01%. The agent(s) may be present in an amount (based on the total weight of the reactivation formulation) of a range between any two of those values, for example between about 0.05% and about 10%, between about 1% and about 8%, or between about 2% and about 6%. In one aspect, the agent(s) are present in an amount (based on the total weight of the reactivation formulation or the components thereof) of a range between about 1% and about 8%.

Nanoparticles

The term "nanoparticles" as used herein means particles having a particle size of less than about 500 nm, and for example may be less than about 450 nm, 400 nm, 350 nm, 300 nm, 250 nm, 200 nm, 150 nm, 100 nm, 90 nm, 80 nm, 70 nm, 60 nm, 50 nm, 40 nm, 30 nm, 20 nm, 10 nm, or 5 nm. The nanoparticles may have a particle size of greater than about 1 nm, 5 nm, 10 nm, 20 nm, 30 nm, 40 nm, 50 nm, 60 nm, 70 nm, 80 nm, 90 nm, 100 nm, 150 nm, 200 nm, 250 nm, or 300 nm. In one aspect, nanoparticles have a particle size less than 200 nm. The nanoparticles may be present in an amount (based on the total weight of the reactivation formulation or the components thereof) of a range between any two of those values, for example between about 1 nm and 200 nm, 1 nm and 100 nm, and 5 nm and 50 nm.

The nanoparticles may be organic or inorganic nanoparticles. Nanoparticles that are colorless are preferred when clear or decorative coatings are used as further coatings.

Examples of organic nanoparticles include carbon based nanoparticles such as carbon black. Examples of inorganic nanoparticles include metal oxides of aluminum, zirconium, silicon, antimony, cerium, gadolinium, cobalt indium, molybdenum, neodymium, tellurium, yttrium, europium, barium, copper, lithium, titanium and tungsten. Other examples of inorganic nanoparticles include carbides such as silicon carbide, sulphates such as $BaSO_4$, carbonates such as $CaCO_3$, phosphates such as $Ca_3(PO_4)_2$ and $FePO_4$, BiOCl and Yttria-stabilized zirconia.

The nanoparticles may be selected from at least one of metal oxides of aluminum, silicon, cerium, zirconium, titanium, carbonates such as calcium carbonates, and organic nanoparticles such as carbon black. The nanoparticles may be selected from carbon black, zirconium oxide, aluminum oxide, and silicon oxide.

Some examples of nanoparticles available in solution are provided below.

| Nanoparticle | Particle Size (nm) | Solids Nanoparticle wt % | Solvent (wherein nanoparticle is present) |
|---|---|---|---|
| Aluminum oxide, surface modified with polysiloxane (linear, nonpolar) | 20 | 30 | methoxy propyl acetate |
| Silicon oxide, surface modified with polysiloxane (linear, nonpolar) | 20 | 25 | methoxy propyl acetate/ methoxy propanol |
| Silicon oxide, surface modified with polysiloxane (branched, polar) | 20 | 20 | methoxy propyl acetate/ method propanol |
| Silicon oxide, surface modified with polysiloxane (linear, med polar) | 20 | 25 | methoxy propyl acetate/ methoxy propanol |
| Silicon oxide, surface modified with polysiloxane (linear, med polar) | 80 | 30 | methoxy propyl acetate/ methoxy propanol |
| Cerium oxide | 10 | 30 | naptha, aromatic free |
| Aluminum oxide | 10 | 30 | 1-methoxy-2-propanol acetate |
| Aluminum oxide | 40 | 50 | 1-methoxy-2-propanol acetate |
| Aluminum oxide | 50 | 20 | Isopropanol |

The nanoparticles may be surface modified, such as with a siloxane, to assist with dispersion or to modify/enhance their compatibility with other components of the reactivation treatment.

The nanoparticles may be spherical particles. The spherical particles may have an aspect ratio of less than approximately 2:1. Spherical particles means that the particles are essentially in spherical form although may also have deviations from the ideal spherical form. For instance, the spherical particles may, for example, be truncated or have a droplet shape. Other deviations from the ideal spherical shape, which can occur as a result of production or agglomeration while dispersing, are also possible.

Without wishing to be limited by theory, it is believed that the nanoparticles ensure that there is adequate disruption or cracking in the reactivation treatment once applied onto a coating in low humidity environments so that the further coating and/or other entity is better able to interact and hence form adhesive interactions with the reactivation treatment and/or reactivated surface of the coating.

The "nanoparticles" as herein described may be pre-dispersed in a solvent, wherein that nanoparticle pre-dispersing solvent is referred to herein as an "additional solvent" (for the nanoparticles) as opposed to the "formulation solvent" and may form part of the "solvent(s)". It will be appreciated that the wt % of the nanoparticle is based on the nanoparticle solid content and not the wt % of the nanoparticle in solution. The additional solvent for pre-dispersing the nanoparticles may be an organic solvent. The additional solvent for pre-dispersing the nanoparticles may be selected from at least one of an ester, ether, alcohol, and ketone. For example, the additional solvent for pre-dispersing the nanoparticles may be selected from methoxy propyl acetate, methoxy propanol, isopropanol, or a combination thereof. The additional solvent for pre-dispersing the nanoparticles may be selected from the same solvent as described above for the "solvent(s)". The "additional solvent(s)" may be the same or different from the "formulation solvent". The additional solvent(s) for the nanoparticles may be provided in an amount (wt % of the total reactivation treatment formulation) in less than about 10, 9, 8, 7, 6, 5, 4, 3, 2, or 1%.

The nanoparticles may be present in an amount (based on the total weight of the reactivation formulation or the components thereof) of more than about 0.001%, 0.005%, 0.01%, 0.05%, 0.1%, 0.2%, 0.3%, 0.4%, 0.5%, 0.6%, 0.7%, 0.8%, 0.9%, 1%, 2%, or 3%. The nanoparticles may be present in an amount (based on the total weight of the reactivation formulation or the components thereof) of less than about 3%, 2%, 1%, 0.9%, 0.8%, 0.7%, 0.6%, 0.5%, 0.4%, 0.3%, 0.2%, 0.1%, 0.05%, 0.01%, or 0.005%. The nanoparticles may be present in an amount (based on the total weight of the reactivation formulation or the components thereof) of a range between any two of those values, for example between about 0.001% and 2%, between about 0.001% and 0.1%, between about 0.01% and about 1%, or between about 0.01% and 0.5%.

Optional Additives

It will be appreciated that the "additives" as described herein are optional and are not essential to the reactivation treatment in activating adhesion on the surface of the organic paint coating. One or more additives, if present, may provide further advantages in addition to the reactivation treatment's reactivation of adhesion to the surface of the organic paint coating. It will be appreciated that the "surface exchange agents" as herein described are separate from and do not fall within the meaning of the optional "additives" as herein described. It will also be appreciated that the "nanoparticles" as herein described provide a separate constituent to the optional "additives" as herein described. For example, the additives, if present, do not contribute to surface reactivation, or are not chemically reactive with the surface of the organic paint coating.

It will be appreciated that all the additives as described below are optional and may be added to further enhance application of the reactivation treatment or further enhance performance characteristics of the completed coating system (e.g. substrate, aged coating, reactivator, final coating). Suitable additives may include:

(a) rheology modifiers such as hydroxypropyl methyl cellulose (e.g. Methocell 311), modified urea (e.g. Byk 411, 410), cellulose acetate butyrates (e.g. Eastman CAB-551-0.01, CAB-381-0.5, CAB-381-20), and polyhydroxycarboxylic acid amides (e.g. Byk 405);

(b) wetting agents such as fluorochemical surfactants (e.g. 3M Fluorad);

(c) surfactants such as fatty acid derivatives (e.g. AkzoNobel, Bermadol SPS 2543), quaternary ammonium salts, ionic and non-ionic surfactants;

(d) dispersants such as non-ionic surfactants based on primary alcohols (e.g. Merpol 4481, DuPont) and alkylphenol-formaldehyde-bisulfide condensates (e.g. Clariants 1494);

(e) anti-foaming agents;

(f) levelling agents such as fluorocarbon-modified polymers (e.g. EFKA 3777);

(g) pigments, such as those used in aerospace paint compositions, which may include organic phthalocyanine, quinaridone, diketopyrrolopyrrole (DPP), and diarylide derivatives and inorganic oxide pigments (for example to enhance visibility of the reactivation treatment and where it has been applied)

(h) dyes including organic and inorganic dyes such as fluorescents (Royale Pigment and Chemicals) (e.g. to enhance visibility of the reactivation treatment and where it has been applied), fluorescein, and phthalocyanines;

(i) anti-corrosion additives such as phosphate esters (e.g. ADD APT, Anticor C6), alkylammonium salt of (2-benzothiazolythio) succinic acid (e.g. BASF, Irgacor 153), triazine dithiols, and thiadiazoles.

For a method of surface reactivation according to the present disclosure, in a particular aspect, the additives do not comprise or consist of silanes and siloxanes.

The additives may be selected from rheology modifiers, wetting agents, surfactants, dispersants, anti-foaming agents, levelling agents, colorants and anti-corrosion agents. The colorant may be a dye or pigment, for example to provide colouration or to see where the activator has been sprayed. Anti-foaming agents may be obtained commercially from, for example, BYK and include BYK-05, BYK-354, and BYK-392. The colorant may be a UV fluorescent dye. The additives may be selected from colorants and anti-corrosion agents. The additives may be selected from dyes and anti-corrosion agents. The additives may be selected from UV fluorescent dyes and anti-corrosion agents. The additives may be UV fluorescent dyes. The additives may be anti-corrosion agents.

The optional additives may be colorants such as dyes. Dyes may be organic, soluble in the surrounding medium, and black or chromatic substances (see Römpp Coatings and Printing Inks, page 221, keyword "colorant"). The optional additives may for example be selected from those as described in the book "Coating Additives" by Johan Bielemann, Wiley-VCH, Weinheim, N.Y., 1998. The dyes may include organic and inorganic dyes. The dyes may be organic dyes, such as azo dyes (e.g. monoazo such as arylamide yellow PY73, diazo such as diarylide yellows, azo condensation compounds, azo salts such as barium red, azo metal complexes such as nickel azo yellow PG10, benzimidazone). The dyes may be fluorescents (e.g. Royale Pigment and chemicals, to enhance visibility of the reactivation treatment and where it has been applied), fluorescein, phthalocyanines, porphyrins. The colorants such as fluorescent dyes could for example be used with UV goggles to look for fluorescence after spraying to insure coverage. It will be appreciated that dyes may be organic soluble for improved compatibility or miscibility with the solvents. Peak absorption may be below about 295 nm, for example, which is the natural cut-on for sunlight. Further examples of fluorescent dyes may include acridine dyes, cyanine dyes, fluorine dyes, oxazine dyes, phenanthridine dyes, and rhodamine dyes.

The optional additives may be colorants such as pigments. Pigments may be in powder or flake-form and can provide colorants which, unlike dyes may be insoluble in the surrounding medium (see. Römpp Lacke and Druckfarben, Georg Thieme Verlag Stuttgart/New York 1998, page 451, keyword "pigments"). Pigments are typically composed of solid particles less than about 1 µm in size to enable them to refract light, for example within light wavelengths of between about 0.4 and about 0.7 µm. In one aspect, pigments have solid particles between about 200 nm and about 1000 nm, such as between about 500 nm and about 1000 nm. The pigments may be selected from organic and inorganic pigments including color pigments, effect pigments, magnetically shielding, electrically conductive, anticorrosion, fluorescent and phosphorescent pigments. Further examples of suitable pigments may, for example, be as described in German Patent Application DE-A-2006053776 or EP-AO 692 007. Organic pigments may include polycyclic pigments (e.g. phthalocyanide such as copper phthalocyanine, anthraquinones such as dibrom anthanthrone, quinacridones such as quinacridone red PV19, dioxazines such as dioxazine violet PV23, perylene, thionindigo such as tetrachloro), nitro pigments, nitroso pigments, quinoline pigments, and azine pigments. The pigments may be inorganic. The inorganic pigments may be selected from carbon black (e.g. black), titanium dioxide (e.g. white), iron oxides (e.g. yellows, reds, browns, blacks), zinc chromates (e.g. yellows), azurites (e.g. blues), chromium oxides (e.g. greens and blues), cadmium sulphoxides (e.g. greens, yellows, reds), lithopones (e.g. whites). Examples of pigments used in aerospace paint compositions may include organic phthalocyanine, quinaridone, diketopyrrolopyrrole (DPP), and diarylide derivatives and inorganic oxide pigments (for example to enhance visibility of the reactivation treatment and where it has been applied).

The anti-corrosion additives may for example facilitate prevention or reduction in corrosion of fasteners (e.g. bare metal or metal alloy based) that might be inserted into or adjacent to coated areas. The use of anti-corrosion additives may provide further advantages for applying coatings containing such fasteners, for example applying a single coating step rather than masking off and pre-preparing the fasteners (conversion coat and primer) prior to coating. Examples of anti-corrosion agents include metal salts including rare earth metals, such as salts of zinc, molybdate, and barium (e.g. phosphates, chromates, molybdates, or metaborate of the rare earth metals).

The additive(s) are usually present in an amount of less than about 10% based on the total weight of the reactivation treatment or the components thereof. For example, the total amount of all additives combined, if present, may be provided in an amount of less than about 10%, 9%, 8%, 7%, 6%, 5%, 4%, 3%, 2%, 1%, 0.5%, 0.1%, or 0.05%. The additives may be provided in an amount of greater than about 0.01%, 0.05%, 0.1%, 0.5%, 1%, 2%, 3%, 4%, 5%, 6%, 7%, 8%, or 9%. The total amount of all additive(s), if present, may be provided in an amount (based on the total weight of the reactivation formulation or the components thereof) of a range between any two of the above values, for example between about 0.01% and about 10%, between about 0.05% and 5%, between about 0.1% and about 3%, or between about 0.5% and about 2%.

Substrates

The organic paint coating is present on a substrate. The substrate may be a support structure, such as a panel constructed for use as a structural support section in a building, vehicle or aircraft. The substrate may be a substantially rigid substrate. The substrate may be a substantially inelastic panel. For example, the substrate may be a panel section of an aircraft body or wing. By substantially inelastic or rigid it is understood that no imposed stretching of the substrate is required in the reactivation process. The substrate may be substantially resilient to deformation, such as substantially resilient to elongation, or resiliently deformable such that the substrate substantially returns to its original shape on deformation thereof. For example, the substrate may have a particular degree of flexibility but can return to its original shape. In one aspect, the substrate is not a flexible plastic or packaging material that can be readily stretched or elongated. In one aspect, the substrate comprises or consists essentially of a metal, metal alloy and/or composite material.

The metal or metal alloys may be aluminum, titanium, or alloys thereof. The composite materials may be carbon fiber reinforced epoxy or glass reinforced epoxy materials. The composite materials may contain glass, wood or fabric. The substrate may be a substantially inelastic or rigid plastic, which may include polyimides or polycarbonates. In one aspect, the substantially inelastic or rigid plastic does not include plastic films or plastic packaging materials that are capable of being stretched or readily manipulated, and/or does not include plastic films or plastic materials that have no structural rigidity or resilient deformability.

The substrate may have a specified ultimate tensile strength and/or maximum tensile elongation property. Industry standard measurement methods for plastic substrates may include ASTM D638 "Standard Test Method for Tensile Properties of Plastics". Industry standard measurement methods for ultimate tensile strength of composite material substrates may include ASTM D3039/D3039M "Standard Test Method for Tensile Properties of Polymer Matrix Composite Materials". Industry standard measurement methods for metallic material substrates may include ASTM E8/E8M "Standard Test Methods for Tension Testing of Metallic Materials".

The tensile elongation property of the substrate may be less than about 50%, 40%, 30%, 20%, 10%, 5%, 4%, 3%, 2%, or 1%. The tensile elongation property of the substrate may be between any two of these values, for example between about 1% and about 50%, such as between about 5% and about 30%. The ultimate tensile strength (in MPa) of the substrate may be at least about 10, 50, 100, 200, 300, 400, 500, 600, 700, or 800 MPa. The ultimate tensile strength (in MPa) of the substrate may be between any two of these values, for example between about 10 MPa and about 800 MPa, such as between about 100 MPa and about 500 MPa.

For example, the ultimate tensile strength and/or maximum tensile elongation property of plastic substrates may be measured using industry standard methods ASTM D638, ASTM D3039/D3039M and/or ASTM E8/E8M at room temperature (23° C./73° F.) and 50% relative humidity. The ultimate tensile strength and/or maximum tensile elongation property of plastic substrates may be measured using ASTM D638 at a testing speed selected from any value between 5 and 500 mm/min, using the lowest speed that ruptures the plastic substrate within 0.5 to 5 mins. For example, the testing speed may be 50 mm/min.

The ultimate tensile strength and/or maximum tensile elongation property of composite material substrates may be measured using ASTM D3039/D3039M at a strain rate selected so as to produce rupture within 1 to 10 min. For example the standard strain rate may be 0.01 $min^{-1}$ and the standard head displacement rate may be 2 mm/min.

The ultimate tensile strength and/or maximum tensile elongation property may be measured using ASTM E8/E8M at a testing speed selected from 0.05 to 0.5 mm/min.

Surface Reactivation Treatment

When the solvent, agent, nanoparticle(s) and optional additive(s) are combined and applied in the form of a reactivation treatment this may take different physical forms such as solution, suspension, mixture, aerosol, emulsion, paste or combination thereof. In one aspect, the treatment is in the form of a solution, emulsion, or aerosol.

The reactivation treatment may be prepared by mixing the components together with any mixing equipment known to those skilled in the art such as but not limited to stirrers, shakers, high speed mixers, internal mixers, inline mixers such as static mixers, extruders, mills, ultra-sound and gas dispersers or by thorough hand shaking. When the reactivation treatment is in the form of a solution, the solution may be prepared as a concentrate and diluted before use or prepared ready for use.

The surface reactivation treatment or formulation may comprise or consist of:
  (a) a solvent which is an ether:alcohol solvent combination, such as a glycol diether:$C_{1-6}$ or $C_{1-4}$ alcohol solvent combination, for example dipropylene glycol dimethyl ether:isopropanol or n-propanol;
  (b) a surface exchange agent which is a titanate or a zirconate or chelates thereof, such as $C_{1-10}$ alkyl titanates, $C_{1-10}$ alkyl ziconates, $C_{1-10}$ alkyl titanate chelates, $C_{1-10}$ alkyl zirconate chelates, for example tetra-i-propyl zirconate, tetra-i-propyl titanate, tetra-n-propylzirconate, tetra-n-butylzirconate, tetra-n-propyltitanate and tetra-n-butyltitanate, in particular tetra-n-propyltitanate or tetra-n-propylzirconate;
  (c) nanoparticles, such as carbon based nanoparticles, for example carbon black or metal oxide nanoparticles, for example zirconium oxide, aluminum oxide, or silicon oxide; and
  (d) optionally an additive selected from rheology modifiers, wetting agents, surfactants, dispersants, anti-foaming agents, levelling agents, colorants, and anti-corrosion agents.

There may be provided a surface treatment formulation for reactivating the surface of an organic paint coating present on a substrate to facilitate adhesion of the organic paint coating to a further coating, wherein other than incidental impurities the formulation comprises or consists of:
  (a) a surface exchange agent selected from at least one of a titanate, zirconate, and chelates thereof;
  (b) a formulation solvent;
  (c) nanoparticles;
  (d) optionally an additive present in an amount of less than about 10 weight % based on the total weight of the formulation.

The features (a)-(d) may be provided by any aspect thereof as described herein. For example, the surface treatment formulation may comprise or consist of:
  (a) the surface exchange agent present in an amount of less than about 8 weight %;
  (b) the formulation solvent present in an amount of at least about 85 weight %;
  (c) nanoparticles present in an amount of less than about 2 weight %; and
  (d) optionally an additive present in an amount of less than about 10 weight %;
wherein the weight % of each of components (a)-(d) is based on the total weight % of the formulation and the total weight % for components (a)-(c), when an additive is not present, or the total weight % for components (a)-(d), when an additive is present, is 100.

The "nanoparticles" as referred to above may be provided in the surface reactivation treatment formulation optionally in a solvent as described herein.

For example, based on aspects as previously described herein, various aspects of the surface treatment formulation may be provided as follows. The surface treatment formulation may further provide the surface exchange agent (a) being present in an amount of between about 1% to about 8% based on the total weight of the formulation. The solvent (b) may be present in an amount of between about 95% to about 98% based on the total weight % of the formulation. The nanoparticles (c) may be present in an amount of less than about 1% based on the total weight % of the formulation. The additive (d) may be present in an amount of less than about 5% based on the total weight % of the formulation. The surface exchange agent may be a zirconate or chelate thereof. The surface exchange agent (a) may be a $C_{1-10}$ alkyl titanate or a chelate thereof or a $C_{1-10}$ alkyl zirconate or a chelate thereof. The $C_{1-10}$ alkyl titanate or a chelate thereof may be tetra-n-propyltitanate or the $C_{1-10}$ alkyl zirconate or a chelate thereof may be tetra-n-propylzirconate. The formulation solvent (b) may be an organic solvent selected from a ketone, alcohol, ether or combinations thereof. The organic solvent may be a glycol, glycol ether, alcohol, glycol monoether alcohol, or combinations thereof. The organic solvent may be an ether:alcohol combination. The ether:alcohol combination may be a glycol diether:$C_{1-6}$ or $C_{1-4}$ alcohol. The glycol diether may be dipropylene glycol dimethyl ether and the $C_{1-4}$ alcohol may be isopropanol and/or n-propanol. It will be appreciated that the "formulation solvent" is the principal solvent system used for surface treatment formulation, and in particular for providing a solvent medium for the surface exchange agent(s). However, the nanoparticles and/or additive(s) may be added to the surface treatment formulation in their own solvent systems that contributes additional solvent(s) to the surface treatment formulation. The additional solvent(s) that may be present with the nanoparticles and/or additive(s), relative to the formulation solvent, may be provided in an amount (wt % of the total reactivation treatment formulation) in less than about 10, 9, 8, 7, 6, 5, 4, 3, 2, or 1%. In an aspect, the additional solvents are the same as those selected for the formulation solvent. In another aspect, the reactivation treatment(s) may contain incidental impurities as described herein that include additional pre-dispersing solvents as described herein.

Other various example aspects of the surface treatment formulation based on aspects as previously described herein, may be provided as follows. The nanoparticles (c) may have a particle size of less than about 200 nm, less than about 100 nm, or in a range of about 1 to about 100 nm or about 1 to about 50 nm. The nanoparticles (c) may be carbon based nanoparticles or metal oxide nanoparticles. The nanoparticles may be selected from at least one of carbon black, zirconium oxide, aluminum oxide, and silicon oxide.

The additives may be selected from rheology modifiers, wetting agents, surfactants, dispersants, anti-foaming agents, levelling agents, colorants and anti-corrosion agents. The colorant may be a dye or pigment, for example to see where the activator has been sprayed. The colorant may be a UV fluorescent dye. The additives may be selected from colorants and anti-corrosion agents. The additives may be selected from dyes, and anti-corrosion agents.

The treatment or formulation may be in the form of a solution or emulsion. Other than incidental impurities the formulation may comprise or consist of dipropylene glycol dimethyl ether, isopropanol or n-propanol; tetra-n-propyl titanate or tetra-n-propyl zirconate; carbon black, zirconium oxide, aluminum oxide, or silicon oxide; and an optional additive.

It will be appreciated that the surface treatment formulation or component thereof may comprise incidental impurities, such as trace amounts of contaminants. For example, the organic solvents may contain trace amounts of water as described herein. The incidental impurities may be less than about 1%, 0.5%, 0.1%, 0.05%, 0.01%, 0.005%, 0.001%, 0.0005%, or 0.0001% (based on the total weight % of the formulation or any of the components thereof).

Color shift (ΔE) is the difference or distance between two colors based on a description of L*, a*, and b* color space, developed by the International Commission on Illumination (CIE) and so usually designated as CIELAB, a representation of color in a 3D, cartesian space with L* representing white/black, a* representing red/green, and b* representing yellow/blue. Since L*, a*, and b* form a Cartesian system, the difference between two points (colors) is ΔE*=square root of (ΔL*× ΔL*+Δa*× Δa*+Δb*×Δb*). The methods as described herein may provide further advantages for reducing, minimizing or preventing color shift (ΔE) of the organic paint coating when measured after the one or more further coatings have been applied to the surface of the organic paint coating. For example, the surface treatment formulation may be capable of providing a color shift (ΔE) of less than 0.5 when, in use, the formulation is applied to the surface of the organic paint coating and subsequently a further coating is applied to the surface of the organic paint coating. The substrates as described herein, when coated with a further coating on the organic coating (that itself is present on the substrate) may provide a color shift (ΔE) of the further coated substrate of less than about 1, or less than about 0.5, compared to the color of the organic coating. The color (ΔE) shift may be less than about 10, 9, 8, 7, 6, 5, 4, 3, 2, 1.0, 0.9, 0.8, 0.7, 0.6, 0.5, 0.4, 0.3, 0.2, 0.1, 0.05, or 0.01 (light source D65, d/8, CIELab color system). The color shift may be between any two of these values, for example between about 0.01 and about 10, such as between about 0.5 and about 5. It will be appreciated that the further coating may be a clear or transparent coating to reduce or prevent color shift.

The ΔE values can range from 0 to 100, and for example be perceived as follows:
<=1.0 Not perceptible by human eyes;
1-2 Perceptible through close observation;
2-10 Perceptible at a glance;
11-49 Colors are more similar than opposite;
100 Colors are exact opposite.

The color measurements may be measured using a sphere geometry using an 8° viewing angle. The sphere geometry may be operated under specular included (spin) conditions or specular excluded (spex) conditions. For example, the color measurements may be used using a BYK Catalogue number 6834 spectro-guide sphere gloss instrument with a d/8 spin color geometry, 60° gloss geometry, 11 mm color aperture and 5×10 mm gloss aperture. The color measured may be in the range of 400 to 700 nm. The illuminant light source may be selected from A, C, D50, D55, D65, D75, F2, F6, F7, F8, F10, F11, UL30. In one aspect, the illuminant is selected to D65, which is a type of defined daylight commonly used. The observer parameter may be selected from 2° and 10°. In one aspect, the observer is selected to 10°. The color measurements may be measured at less than 85% relative humidity and at 35° C. (95° F.).

The color measurements may also be measured using industry standard color measurement methods may include ASTM D2244, ASTM E308 and ASTM E1164.

The color measurement characterization may be performed using the CIELab color system. By way of example only, the system consists of 3 components which form a Cartesian coordinate system and consists of 3 components that characterize lightness (L*), which is a scale from black to white, and two measurements which characterize the hue (a*), which is a scale green to red scale, and the hue (b*) which is a scale from yellow to blue scale. The total change of color ΔE* is commonly used and is defined as ΔE*=Square root of (ΔL*×ΔL*+Δa*×Δa*+Δb*×Δb*).

The reactivation treatment may be formulated as a spray formulation. It will be appreciated that the components of the formulation can be selected to provide a particular rheology or viscosity to the formulation for particular environments such that, in use, the formulation is suitable for spray application. The spray formulation may be prepared for use with particular spray guns and systems (e.g. pressures, flow rates and nozzle diameters). The spray formulation may for example provide a wet film capable of drying to form a powder of about 0 to about 15 microns thick, such as about 0.1 to about 5 microns thick, such as about 0.5 to about 2 microns thick, such as about 0.1 to about 1 micron thick. The spray formulation may for example provide a yield of coverage of about 1 to about 50 m²/L, such as about 15 to about 30 m²/L.

BRIEF DESCRIPTION OF DRAWINGS

In the examples, reference will be made to the accompanying drawings, wherein:

FIG. 2 highlights visual representations relating to a scale of 1 to 10 corresponding to maximum tear length and % area of coating removed under rain erosion testing.

Significant gray paint removal without treatment at low humidity (4.2 mb partial water vapor pressure)

Low gray paint removal when the white coating is reactivated under higher humidity (10.3 mb partial water vapor pressure) using AT-1

Higher relative gray paint removal when the white coating is reactivated under low humidity (4.2 mb partial water vapor pressure) using AT-1

Figure 1:
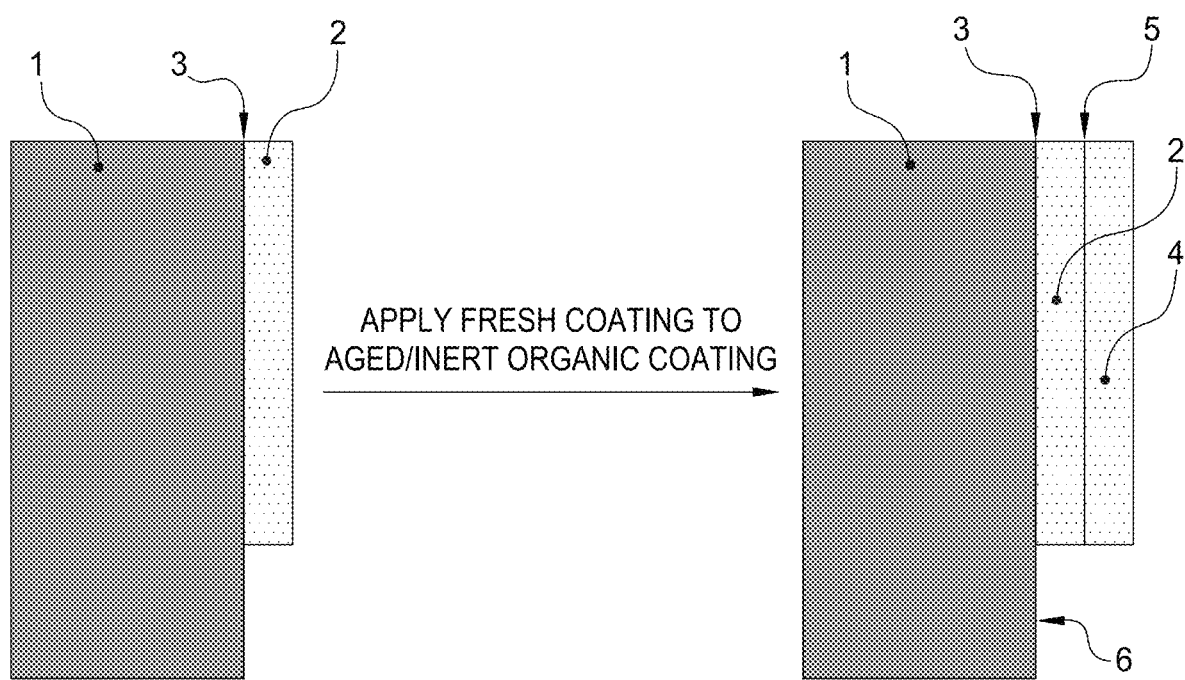
FIG. 1 is a schematic representation of a panel section of an in service aged organic paint coating previously adhered to and present on a substrate of a panel section that is treated for reactivation of its surface adhesion properties to facilitate adhering a further organic coating onto the in service aged organic paint coating without damaging the integrity of that in service aged organic paint coating to the substrate.
Figure 3:
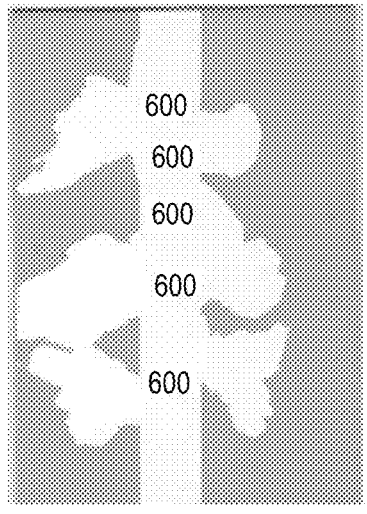
FIG. 3 is images illustrating the amount of gray paint removed from white paint using Single Impact Jet Apparatus (SIJA) techniques with and without different surface treatments. Note that large amounts of paint removal indicate poor adhesion; less paint removal indicates better adhesion. The images demonstrate:
 Significant gray paint removal without reactivation treatment at low humidity (4.2 mb partial water vapor pressure).
 Low gray paint removal when the white coating is reactivated under higher humidity (10.1 mb partial water vapor pressure) using AT-1
 Higher relative gray paint removal when the white coating is reactivated under low humidity using AT-1
 Less gray paint removal under low humidity when AT-1 is modified to include nanoparticles
Figure 4:
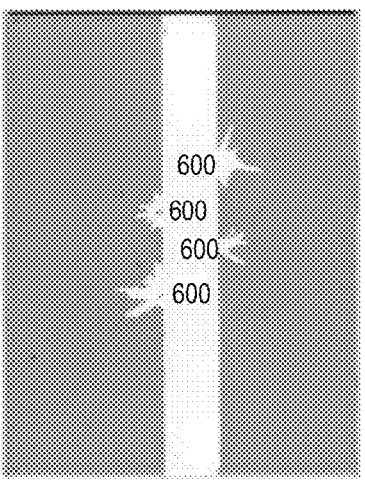
FIG. 4 is images illustrating Single Impact Jet Apparatus results demonstrating different amounts of gray paint removal from white paint under low humidity (3.0 to 3.5 mb partial water vapor pressure) conditions. The results demonstrate:
 Significant gray paint removal without reactivation treatment at low humidity
 Low gray paint removal when the white coating is reactivated under higher humidity (10.1 mb partial water vapor pressure) using AT-1,
 Higher relative gray paint removal when the white coating is reactivated under low humidity using AT-1
 Less gray paint removal when AT-1 is modified to include nanoparticles
Figure 5:
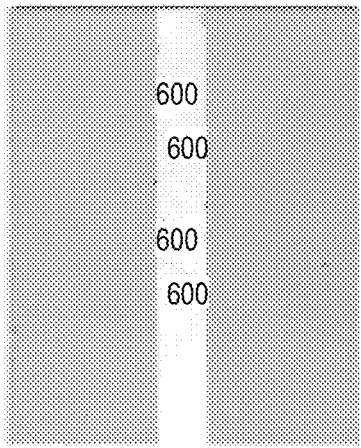
FIG. 5 is images illustrating Single Impact Jet Apparatus results demonstrating paint removal from white paint under high humidity (10.3 mb partial water vapor pressure) conditions. The results demonstrate:
 Without reactivation significant gray paint is removed at high humidity
 Reactivation conducted at high humidity conditions using AT-1 is effective in improving adhesion of the gray coat to the white coat Inclusion of carbon black to the treatment does not negatively affect the gray coating adhesion when reactivation is conducted under high humidity conditions and produces results similar to AT-1.
Figure 6:
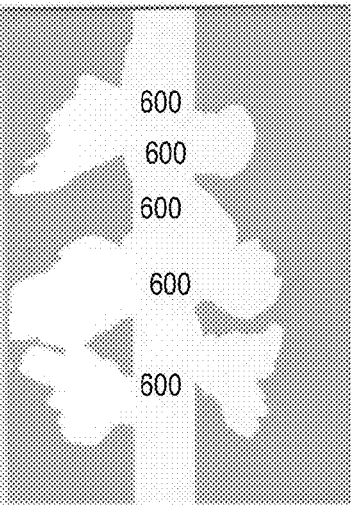
FIG. 6 is images illustrating Single Impact Jet Apparatus (SIJA) results demonstrating the amount of gray paint removed from white paint with and without different surface treatments. Note large amounts of paint removal indicate poor adhesion; less paint removal indicates better adhesion. The images demonstrate.
Figure 8:
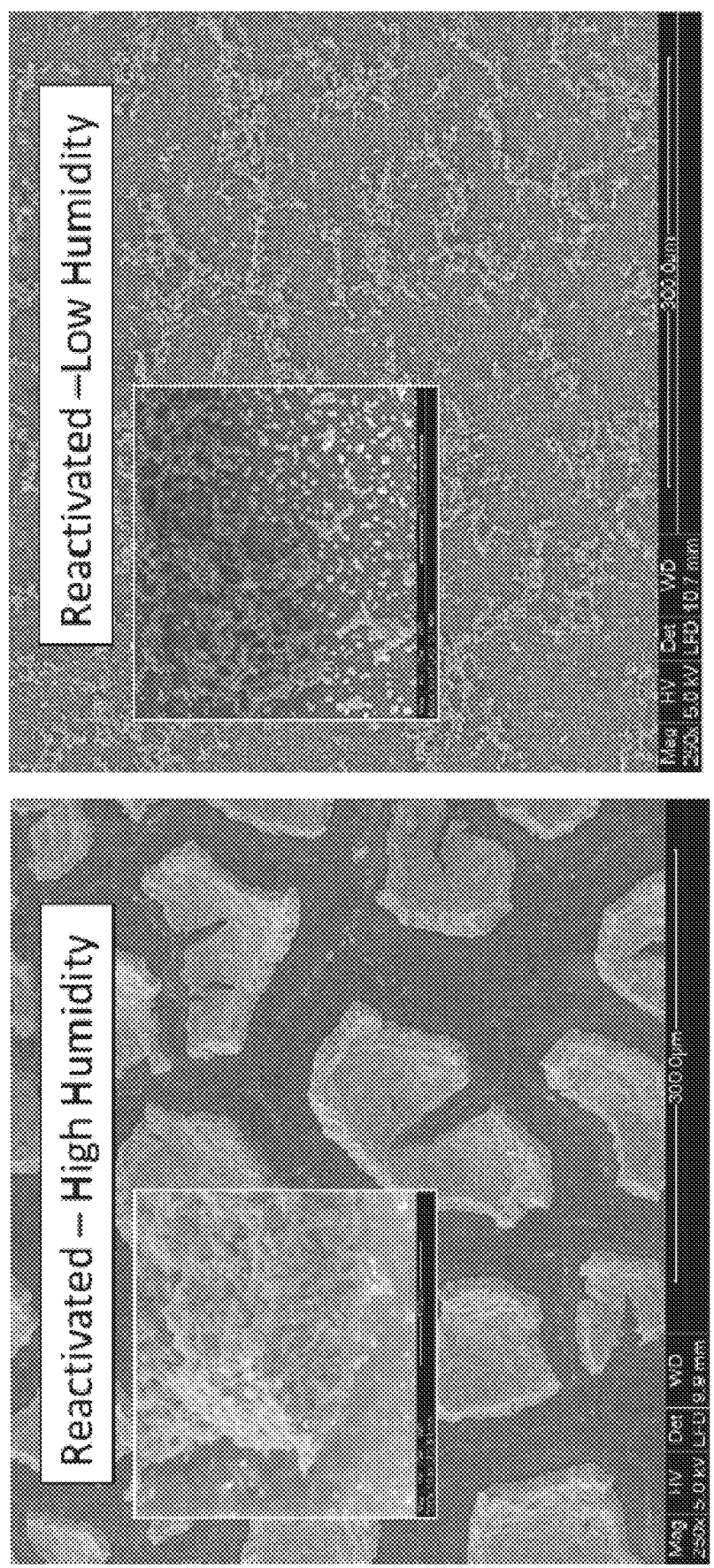

Less gray paint removal under low humidity (4.2 mb partial water vapor pressure) when AT-1 is modified to include nanoparticles FIG. 7 is Scanning Electron Microscope images showing residue morphology of AT-1 reactivation treatment with no added nanoparticles when applied under high (38% RH, 68° F.; 8.9 mb) and low humidity (13% RH, 66° F.; 2.7 mb) conditions to DHS CA8000/BAC70846 with 4:1 (C:C2) thinner. The images demonstrate:

High humidity application produces fine, textured, open (porous) structure of residue Low humidity application produces a more continuous, smooth, gel-like (less porous) structure of residue FIG. 8 is Scanning Electron Microscope images showing residue morphology of AT-1 reactivation treatment with 0.005 wt % Special Black 5 (50 nm) nanoparticles added when applied under high and low humidity conditions. The images demonstrate:

High humidity application produces fine, textured, open (porous) structure of residue similar to that in FIG. 7

Low humidity application produces a somewhat more texture open structure than that in FIG. 7

Figure 9:
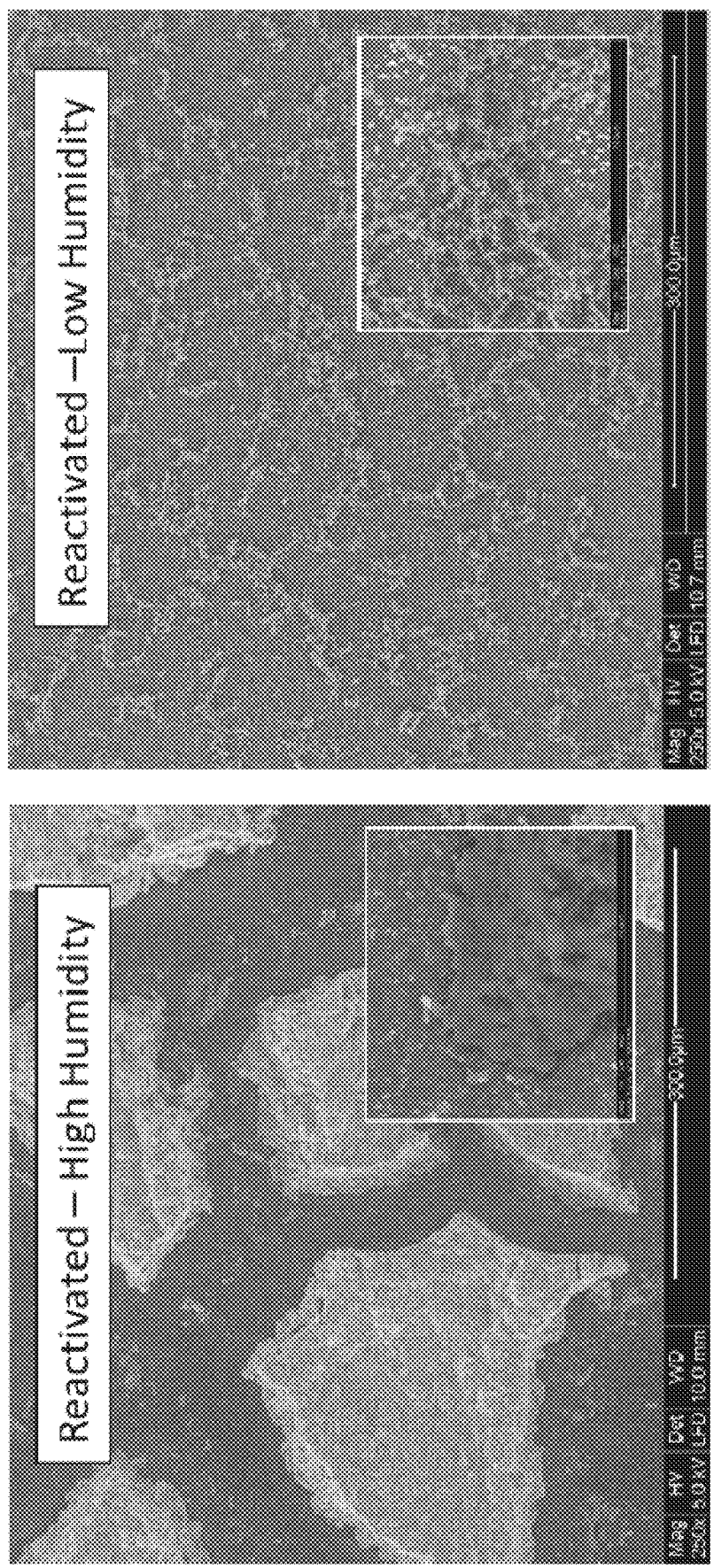

FIG. 9 is Scanning Electron Microscope images showing AT-1 reactivation treatment with 0.01 wt % Special Black 5 (50 nm) nanoparticles added residue morphology when applied under high and low humidity conditions. The images demonstrate:

High humidity application produces fine, textured, open (porous) structure of residue similar to that in FIG. 7

Low humidity application produces a somewhat more texture open structure than that in FIG. 7

Figure 10:
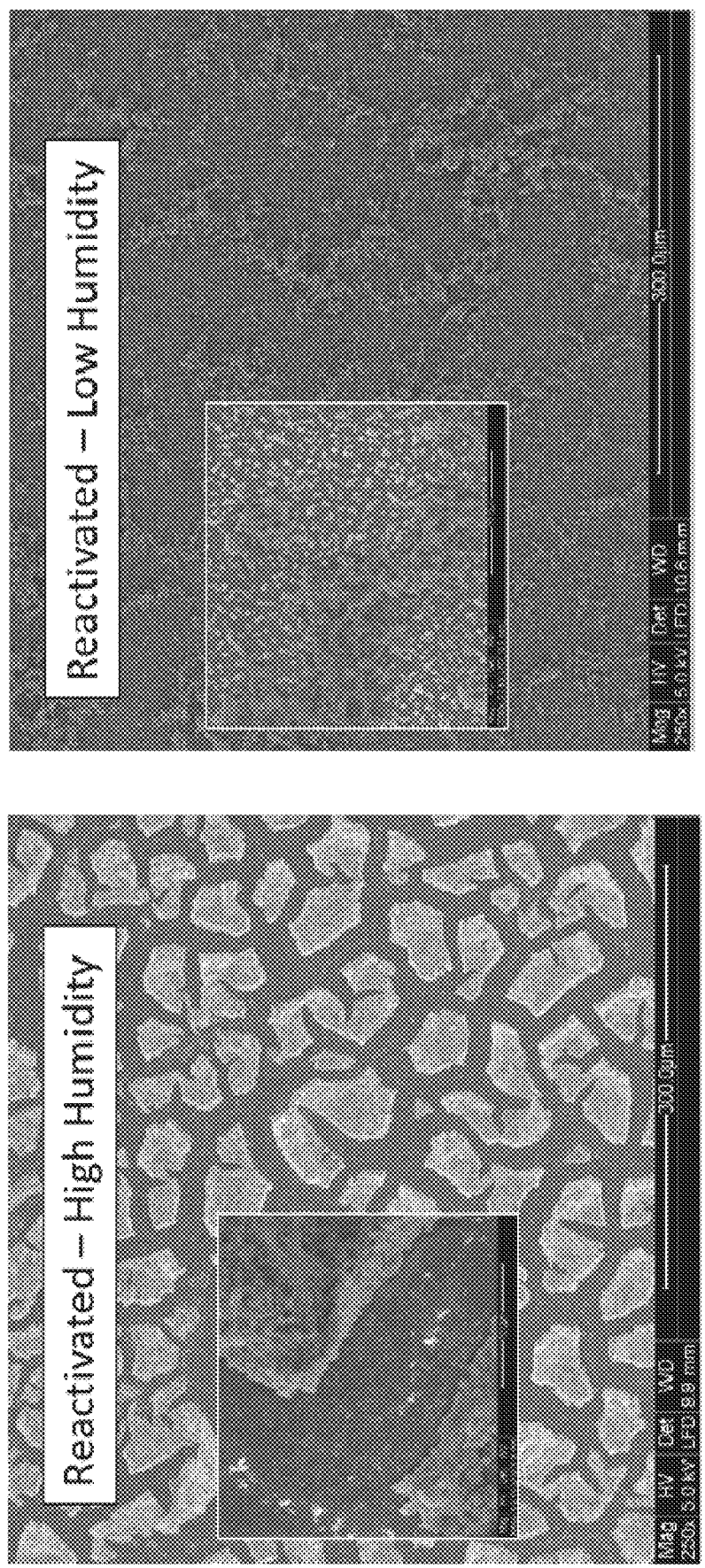

FIG. 10 is Scanning Electron Microscope images showing AT-1 reactivation treatment with 0.05 wt % Special Black 5 (50 nm) nanoparticles added residue morphology when applied under high and low humidity conditions. The images demonstrate:

High humidity application produces fine, textured, open (porous) structure of residue similar to that in FIG. 7

Low humidity application produces a somewhat more texture open structure than that in FIG. 7

Figure 11:
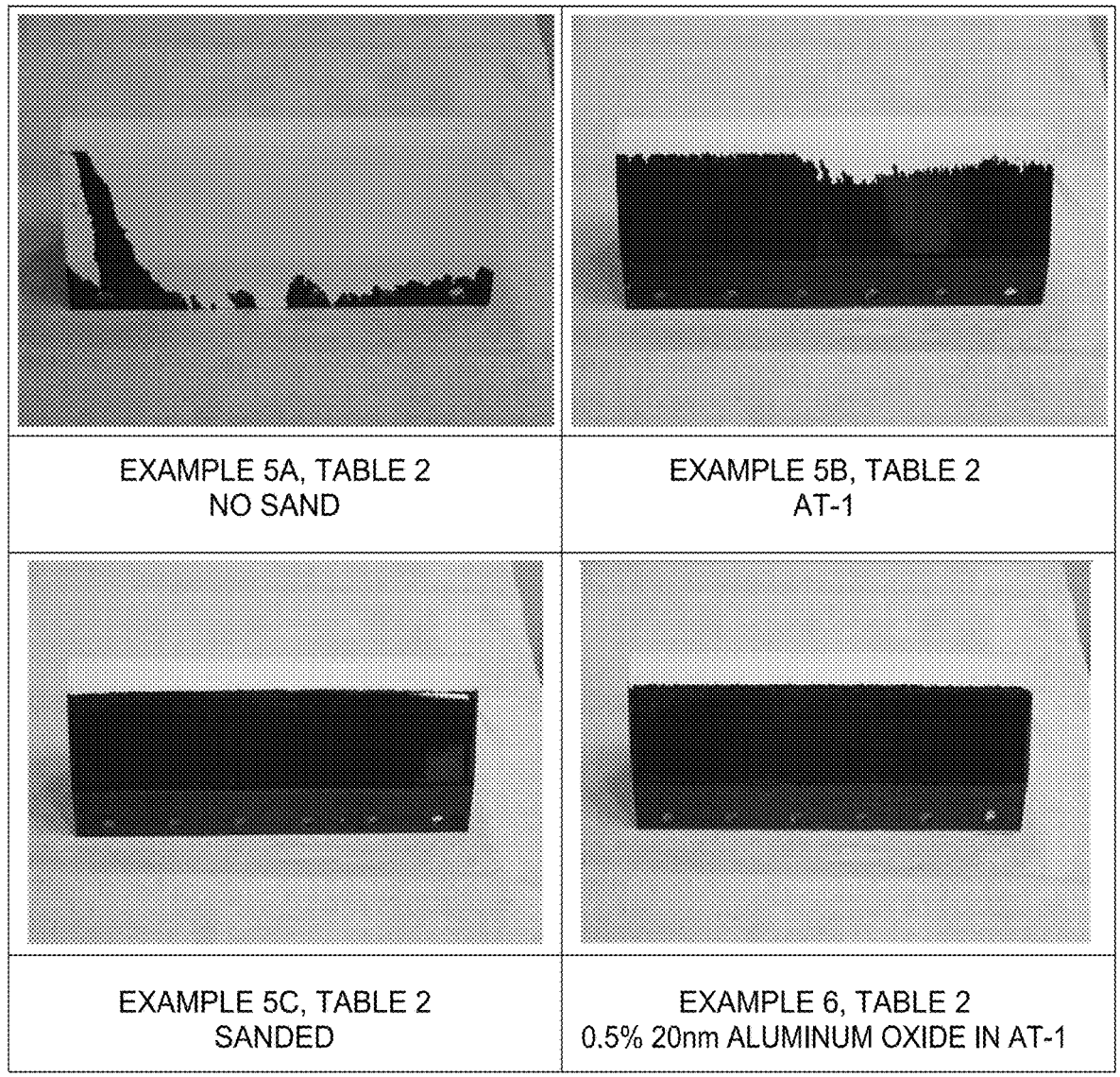
Figure 12:
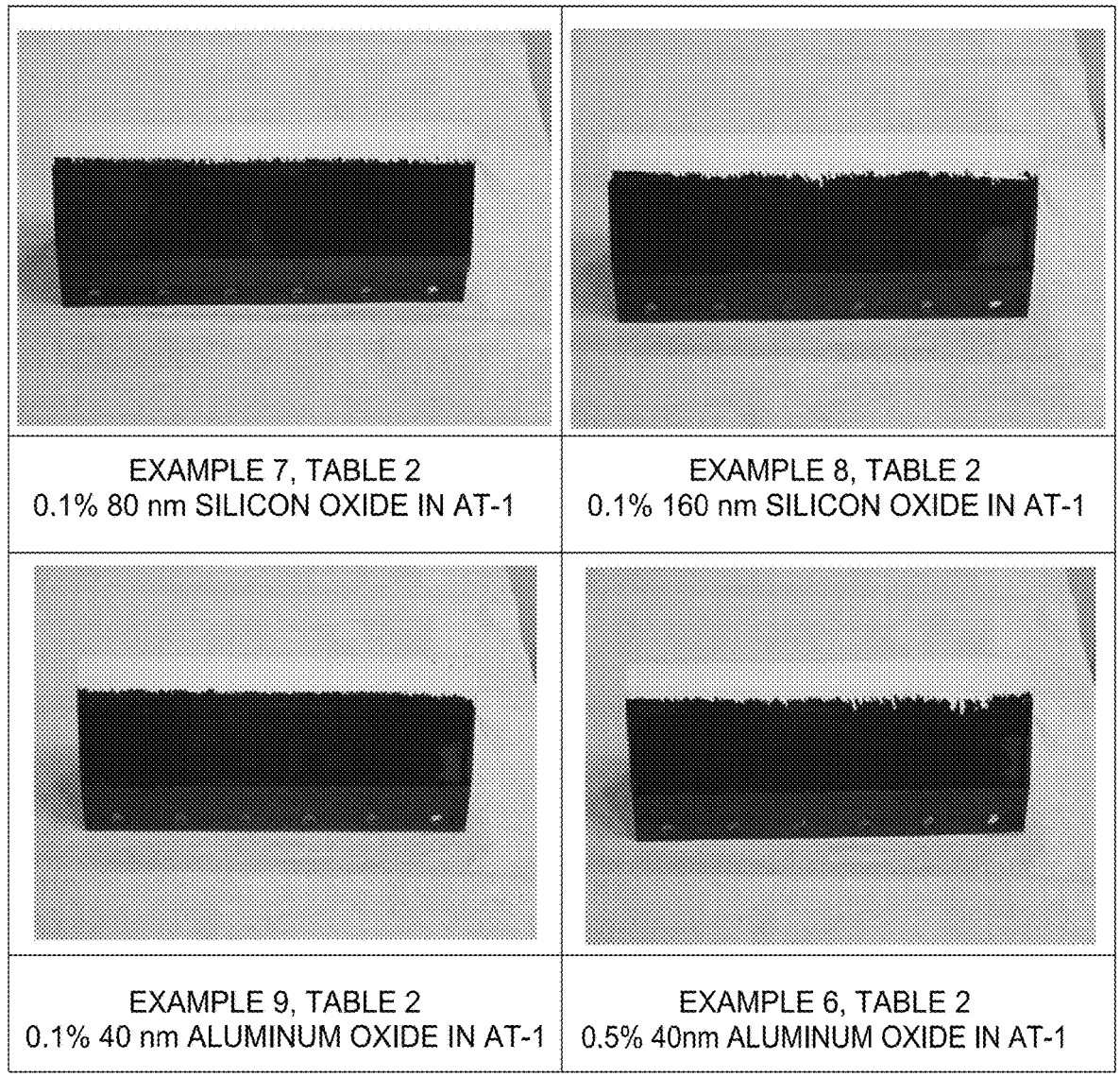

FIGS. 11-13 are whirling arm rain erosion results demonstrating different amounts of blue paint removal using different surface treatments applied under low humidity conditions. The images demonstrate:

Significant blue paint removal without reactivation treatment.

Less paint removal relative to no treatment when the white coating is reactivated with AT-1.

Even less paint removal when AT-1 is modified to include nanoparticles.

EXAMPLES

Aspects of the present disclosure will now be described with reference to the following non-limiting examples. Details of the products mentioned by trade names in the examples are as follows:

Al 2024-T3 clad—[Grade of Aluminum typically used in aerospace applications]

Ardrox 1250—[Mildly acidic cleaning material containing hydroxyethane phosphonic acid, potassium hydroxyethane phosphonate, and primary alcohol ethoxylate; from Chemetall]

AC-131-CB—[Non-chromated conversion coating (water based, zirconium n-propoxide, 3-glycidoxypropyl) trimethoxysilane solgel) for metals like Aluminum, 3M]

PPG Desothane HS/DHS—[High solids Polyurethane coating, PPG Aerospace PRC-DeSoto]

CA8000/B7084X—[White Polyurethane base component of PPG Desothane HS/DHS coating, PPG Aerospace PRC-DeSoto]

CA8000/B707X—[Gray Polyurethane base component of PPG Desothane HS/DHS coating, PPG Aerospace PRC-DeSoto]

CA8000/B50103X—[Blue Polyurethane base component of PPG Desothane HS/DHS coating, PPG Aerospace PRC-DeSoto]

CA8000C—[Organic thinner component of PPG Desothane HS/DHS coating. Referred to as "C" in examples]

CA8000C2—[Organic thinner component of PPG Desothane HS/DHS coating containing added coating organotin catalyst. Referred to as "C2" in examples]

AT-1—[Tetra-n-propylzirconate in dipropylene glycol dimethyl either/n-propanol solvent reactivator supplied by Zip-Chem as Sur-Prep AP-1]

Inorganic nanoparticles listed on page 13 and Tables 1 and 2 have been sourced from BYK Additives & Instruments or Sigma Aldrich. Carbon Black (such as Special Black 5 and Special Black 100) was sourced from Evonik Degussa.

Nanoparticles used in the non-limiting Examples 1 to 14 were sourced as indicated in the below:

| Used in Examples | Product | Particle size (nm) | Particle | Particle Surface Treatment | Solids (Wt %) | Density (gm/ml) | Solvent |
|---|---|---|---|---|---|---|---|
| 7 | BYK LP-X-21193 | 80 | Silicon oxide | polysiloxane (linear, med polar) | 30 | 1.14 | methoxy propylacetate/ methoxy propanol |
| 8, 13 | BYK Nanobyk 3652A | 160 | Silicon oxide | polysiloxane (linear, med polar) | 70 | 1.88 | methoxy propylacetate/ methoxy propanol |

-continued

| Used in Examples | Product | Particle size (nm) | Particle | Particle Surface Treatment | Solids (Wt %) | Density (gm/ml) | Solvent |
|---|---|---|---|---|---|---|---|
| 6, 14 | BYK LP-X-21441 | 10 | Aluminum oxide | polyester based block copolymer | 30 | 1.24 | methoxy propylacetate/ methoxy propanol |
| 9, 10, 14 | BYK LP-X-20693 | 40 | Aluminum oxide | polyester based block copolymer | 50 | 1.53 | methoxy propylacetate/ methoxy propanol |
| 11, 12 | Aldrich 702129 | <50 | Aluminum oxide | unknown | 20 | 0.79 | isopropanol |
| 1 | Evonik Degussa Printex XE 2B | 35 | Carbon Black | Unknown | 100 | | None |
| 2, 3 | Evonik Degussa Special Black 5 | 50 | Carbon Black | Unknown | 100 | | None |
| 2, 3 | Evonik Degussa Special Black 100 | 20 | Carbon Black | Unknown | 100 | | None |
| 4 | Aldrich 544760 | <100 | Zirconium oxide | Unknown | 100 | | None |
| 14 | BYK Nanobyk 3652 | 20 | Silicon oxide | polysiloxane (linear, med polar) | 25 | | methoxy propylacetate/ methoxy propanol |

The following procedure was used to prepare the examples for testing.

Prepare Substrate SIJA Panels/Rain Erosion Foils

The substrates used in the examples were Al 2024-T3 clad, although the substrate can be readily varied to other metals, metal alloys or a composite material, or other substantially inelastic or rigid substrate as previously described.

For aluminum substrate:
  a. Clean. Cleaning may be done with i) a rubbing solvent such as methyl propyl ketone with a wiper onto the surface and then drying thoroughly with clean wipers and or ii) by using an alkaline cleaner such as Chemetall Pace B-82 and rubbing with a very fine abrasive pad such as 3M Scotchbrite™ #7447 followed by thorough rinsing to remove residue.
  b. Deoxidize. Deoxidation may be done by i) abrading with a very fine abrasive aluminum oxide pad and rinsing the residual abrasive powder off with copious quantities of water or ii) by applying an acid cleaner such as Ardrox 1250 by Chemetall, keeping the panel wet for 10 to 20 minutes, and then rinsing with copious quantities of water.
  c. Apply a conversion coat. The conversion coat may contain corrosion inhibitors. The conversion coat used here was AC-131-CB by 3M. Conversion coat should be applied by the manufacturer's instructions.

Apply Primer

For composite or aluminum, application of common aerospace epoxy based primer optionally incorporating additives to aid corrosion resistance at 0.4 mil (10 micron) to 1.5 mil (38 microns) dry film thickness (dft) per manufacturer instructions at 65° F. to 85° F. at 30-60% RH and cure at ambient conditions for 1 to 24 hours. All panels/foils used in testing were aluminum.

Prepare First Organic Paint Coating (First Topcoat)

Apply polyurethane topcoat (e.g.: PPG Desothane HS topcoat containing CA8000/B70846X base—white color of this topcoat also designated as BAC 70846, thinners used include PPG Aerospace PRC-DeSoto Desothane HS CA8000C and CA8000C2 thinner components. Activator component is CA8000B)

a. At 2.0 to 4.0 mils (50 to 100 microns). Application is typically at 65° F. to 95° F., generally at about 75 F, and at relative humidity at up to 70% RH. Application is generally using HVLP spray gun, such as a Binks M1-H HVLP gun with a 92 to 94 nozzle or DeVilbiss Compact Gravity with a 1.4 tip.
  b. Flash first topcoat. Solvent is flashed off of topcoat panels/foils, typically for one hour and at same conditions as topcoat application.
  c. Cure first topcoat. Top coated panels/foils are cured under conditions indicated in examples. These conditions are typically 120 F with relative humidity between 3 and 18% RH followed by a post cure that is typically at ambient conditions (eg. 75 F and 30 to 60% RH) for between 1 day and 14 days.

Tape First Topcoat
  i. SIJA panels: The first topcoat was over-coated with promoter and the second topcoat following taping through the middle of the coupon with 3M vinyl tape (#471) to form a paint edge on its removal. This edge was the impact target for SIJA (Single Impact Jet Apparatus) analysis.
  ii. Rain erosion foils: Following cure of the first topcoat layer, the front (bullnose) of the foils were masked (Intertape Polymer Group, PG-777 tape) prior to overcoating. After the overcoat was applied and cured, the tape was removed.

Prepare Reactivation Treatment
  a. Mix reactivation treatment. Four methods: Method i and ii were used if nanoparticles came in powdered form. Method iii and iv were used if nanoparticles are in pre-dispersed form. Carbon black organic powder nanoparticles used methods i and ii. Zirconium oxide inorganic nanoparticles used method i. Pre-dispersed inorganic particles used methods iii and iv. AT-1 was made using 1-8% surface exchange or transesterification agent such as zirconates or titanates, in an alcohol: dipropylene glycol dimethyl ether solvent mix. Typical preparation of AT-1 involves preparing two solutions (Part A and Part B) which are mixed together prior to application. Part B typically contains an ether/alcohol solvent mix, while Part A includes the surface or transesterification agent dissolved in an alcohol. The solvents used are anhydrous, although water present in the solvent can be tolerated without loss of activity of the treatment as long as water is present in minor amounts, for example trace amounts of up to 800 ppm for the present zirconates or titanates. Part A and Part B are combined prior to application (with shaking/stirring), and the nanoparticles added either to part A or Part B prior to combining the two parts, or to premixed Part A and part B as described below;
  i. Powdered form: Disperse nanoparticles into AT-1 and sonicate for 1-5 minutes to ensure "bundles" of carbon black or zinc oxide powder nanoparticles are dispersed. This was done by placing sealed glass vial containers into ultrasound water bath at room temperature and then turning on the bath.
  ii. Powdered form: Disperse nanoparticles in part B of AT-1 with ultrasound for 1 to 5 minutes. Then add AT-1 part A into Part B with no ultrasound, just shaking or mixing for at least one minute.
  iii. Pre-dispersed form: Add pre-dispersed nano-particles into AT-1 and shake by hand or mixer for at least one minute.
  iv. Pre-dispersed form: Add pre-dispersed nano-particles to Part B of AT-1 and shake by hand or mixer for at least one minute. Then add Part A of AT-1 into Part B and shake by hand or mixer for at least one minute.
b. Apply reactivation treatment. No cleaning or washing of the first topcoat or any other pre-treatment or reactivation treatment is necessary prior to application of the reactivation treatment. Reactivation treatment applied at 68° F. to 77° F. at water vapour pressures and relative humidity indicated in the examples (typically at water vapour pressure of less than 5 mb corresponding to relative humidities of around 20% or less at 70° F.). Application is generally using HVLP spray gun, such as Binks M1-H HVLP gun with a 92 or 94 nozzle or Devilbiss Compact Gravity with a 1.4 tip.
c. Dry reactivation treatment. Reactivation treatment typically dried for 2 hours (30 minutes to 1 day) at temperature and relative humidity of reactivation treatment application as indicated in the example.

Prepare Further Coating (Second Topcoat)
a. Apply overcoat. Application of polyurethane topcoat (e.g.: PPG Desothane HS topcoat containing CA8000/1350103X base—blue color of this topcoat also designated as BAC 50103 or PPG Desothane HS topcoat CA8000/13707X base gray) at 3.5 to 5.0 mils (85 to 125 microns). Application is typically at 65° F. to 85° F., generally at about 75° F., and at relative humidity typically the same as the promoter application. Application is generally using HVLP spray gun, such as Binks M1-H HVLP gun with a 92 or 94 nozzle or DeVilbiss Compact Gravity with a 1.4 tip.
b. Flash second topcoat. Solvent is flashed off of topcoat panels/foils, typically for one hour and at same conditions as second topcoat application.
c. Cure second topcoat. Top coated panels/foils are cured under conditions indicated in examples. These conditions are typically at 120° F. with relative humidity between 3 and 18% RH at 120° F. for 3 to 24 hours. The post cure is typically at ambient conditions (e.g. 75° F. and 30 to 60% RH) for between 7 and 14 days prior to testing.

Remove Tape prior to testing from SIJA panels/rain erosion foils.

Adhesion Test Methods

The table below details the equipment and conditions used for testing

| Equipment | Conditions. |
|---|---|
| SIJA | SIJA Adhesion testing was completed using a Single Impact Jet Apparatus (SIJA, Cambridge). The initial equipment was typically configured using a 0.8 mm nozzle and employed 0.22 calibre 5.5 mm Crosman Accupell Pointed Pellets (#11246). Testing was completed following immersion in water for 16 to 18 hours, employing a line laser to locate the impact position, and using a 45° specimen to impact droplet geometry. Surface water was then removed by lightly wiping with a clean wiper. A single water jet was employed at each site to test adhesion. The nominal velocity of each individual shot was recorded next to the impact site for future reference. The impact velocity employed was 600 ± 25 m/s. In some examples, the amount of overcoat removed, and hence the inter-coat adhesion, was assessed employing image analysis techniques to quantify the area of paint removed. The more overcoat removed corresponded with inferior inter-coat adhesion. |
| Whirling Arm Rain Erosion Testing | Rain erosion testing was completed on a whirling arm rain erosion apparatus employing a 1.32 m (52 inch) zero lift helicopter like propeller run at 3600 rpm. The foils were attached to the propeller at a distance along the propeller correlating to a velocity of 170 ms$^{-1}$ (380 mile per hour) at the midpoint of the foil. The effective rain field density of 2 mm droplets used during the experiment was 2.54 × 10$^{-5}$ kmh$^{-1}$ (1 inch per hour). After 30 minutes, the impact of rain erosion on the inter-coat adhesion of the foils was evaluated according to the amount of paint removed or tear lengths. The impact of water droplets on the leading edge of the over-coat formed on removal of the tape during the experiment erodes the over-coating layer relative to the strength of inter-coat adhesion. |

Examples 1 to 13

Table 1 below sets out the test results of Examples 1 to 4. All coupons were tested in Singe Impact Jet Apparatus (SIJA)

TABLE 1

| Ex. No. | Nanoparticles | Paint System | FIG. No. | Temperature/% Relative Humidity of Reactivation Treatment Application (Water vapor pressure in mb) |
|---|---|---|---|---|
| 1 | Carbon Black Average particle size 35 nm | First Topcoat: DHS CA8000 BAC 70846 white (4:1 PPG Aerospace PRC-DeSoto Desothane HS CA8000C:CA8000C2 thinner components); cured 16 hours at 120° F., 3% RH, then 24 hours at 75° F., 12% RH<br>Second Topcoat: DHS CA8000 BAC 707 gray (C thinner) cured 72 hours at 120° F., 3% RH | 3 | Low humidity: 68° F., 18% RH (4.2 mb) High humidity: 68° F., 44% RH (10.3.mb) |
| 2 | Carbon Black Average particle size 50 nm<br>Average particle size 20 nm | First Topcoat: DHS CA8000 BAC 70846 white, (4:1 PPG Aerospace PRC-DeSoto Desothane HS CA8000C:CA8000C2 thinner components); cured 16 hours at 120° F., 3% RH then 24 hours at 75° F., 12% RH<br>Second Topcoat: DHS CA8000 BAC707 gray (C thinner) cured 72 hours at 120° F., 8-12% RH | 4 | Low humidity: 70° F., 12-14% RH (3.0 to 3.5 mb) High humidity: 68° F., 43% RH (10.1 mb) |
| 3 | Carbon Black Average particle size 50 nm<br>Average particle size 20 nm | First Topcoat: DHS BAC 70846 (C thinner); cured 16 hours at 120° F., 18% RH then 69 hours at 75° F., 70% RH<br>Second Topcoat: DHS BAC 707 (C thinner); cured 3 days at 120° F. in oven. | 5 | 68° F., 43% RH (10.1 mb) |
| 4 | Zirconium oxide Average particle size 50 nm | First Topcoat DHS BAC 70846 (4:1 C:C2 thinner) cured 16 hours at 120° F., 3% RH, then 24 hours at 75° F., 12% RH<br>Second Topcoat DHS BAC707 (C thinner); cured 3 days at 120° F. in oven | 6 | Low humidity 68° F., 18% RH (4.2 mb) High humidity 68° F. 44% RH (10.3 mb) |

Table 2 below sets out the test results of Examples 5 to 13. All reactivation treatments are applied at 76.5° F., 9.4% RH (2.9 mb). All foils were tested in Whirling Arm Rain Erosion.

TABLE 2

| Ex. No. | Nanoparticle | Paint System | Max Tear Results in 1/32 inch)* |
|---|---|---|---|
| 5 | a) None<br>b) AT-1 (standard treatment)<br>c) Sanded | DHS 70846 white (4:1 C:C2 thinner); cured at 120° F., 3% RH for 96 hours then 10 days ambient (nominally 70° F., 40% RH)<br>Second Topcoat: DHS CA8000 50103 blue (C thinner); cured at 120° F., 8-12% RH for 4-5 hours then 20-30 days ambient (nominally 70° F., 40% RH) | Example 5a) No Sand: 80<br>Example 5b) AT-1: 14<br>Example 5c) sand: 2 |
| 6 | 0.5% 10 nm aluminum oxide | DHS 70846 white (4:1 C:C2 thinner); cured at 120° F., 3% RH for 96 hours then 10 days ambient (nominally 70° F., 40% RH)<br>Second Topcoat: DHS CA8000 50103 blue (C thinner); cured at 120° F., 8-12% RH for 4-5 hours then 20-30 days ambient (nominally 70° F., 40% RH) | 2 |
| 7 | 0.1% 80 nm silicon oxide | DHS 70846 white (4:1 C:C2 thinner); cured at 120° F., 3% RH for 96 hours then 10 days ambient (nominally 70° F., 40% RH)<br>Second Topcoat: DHS CA8000 50103 blue (C thinner); cured at 120° F., 8-12% RH for 4-5 hours then 20-30 days ambient (nominally 70° F., 40% RH) | 4 |

TABLE 2-continued

| Ex. No. | Nanoparticle | Paint System | Max Tear Results in 1/32 inch* |
|---|---|---|---|
| 8 | 0.1% 160 nm silicon oxide | DHS 70846 white (4:1 C:C2 thinner); cured at 120° F., 3% RH for 96 hours then 10 days ambient (nominally 70° F., 40% RH) Second Topcoat: DHS CA8000 50103 blue (C thinner); cured at 120° F., 8-12% RH for 4-5 hours then 20-30 days ambient (nominally 70° F., 40% RH) | 5 |
| 9 | 0.1% 40 nm aluminum oxide | DHS 70846 white (4:1 C:C2 thinner); cured at 120° F., 3% RH for 96 hours then 10 days ambient (nominally 70° F., 40% RH) Second Topcoat: DHS CA8000 50103 blue (C thinner); cured at 120° F., 8-12% RH for 4-5 hours then 20-30 days ambient (nominally 70° F., 40% RH) | 4 |
| 10 | 0.5% 40 nm aluminum oxide | DHS 70846 white (4:1 C:C2 thinner); cured at 120° F., 3% RH for 96 hours then 10 days ambient (nominally 70° F., 40% RH) Second Topcoat: DHS CA8000 50103 blue (C thinner); cured at 120° F., 8-12% RH for 4-5 hours then 20-30 days ambient (nominally 70° F., 40% RH) | 10 |
| 11 | 0.1% <50 nm aluminum oxide | DHS 70846 white (4:1 C:C2 thinner); cured at 120° F., 3% RH for 96 hours then 10 days ambient (nominally 70° F., 40% RH) Second Topcoat: DHS CA8000 50103 blue (C thinner); cured at 120° F., 8-12% RH for 4-5 hours then 20-30 days ambient (nominally 70° F., 40% RH) | 8 |
| 12 | 0.5% <50 nm aluminum oxide | DHS 70846 white (4:1 C:C2 thinner); cured at 120° F., 3% RH for 96 hours then 10 days ambient (nominally 70° F., 40% RH) Second Topcoat: DHS CA8000 50103 blue (C thinner); cured at 120° F., 8-12% RH for 4-5 hours then 20-30 days ambient (nominally 70° F., 40% RH) | 8 |
| 13 | 0.5% 160 nm silicon oxide | DHS 70846 white (4:1 C:C2 thinner); cured at 120° F., 3% RH for 96 hours then 10 days ambient (nominally 70° F., 40% RH) Second Topcoat: DHS CA8000 50103 blue (C thinner); cured at 120° F., 8-12% RH for 4-5 hours then 20-30 days ambient (nominally 70° F., 40% RH) | 7 |

*Note:
Per standard test protocol, the last 0.25 inch of each end of the foil is not used in the tear evaluation due to end effects and handling during test preparation.

Example 14

Nanoparticle Effect on Color
Delta E Comparison Between No Reactivator and Reactivator

| Activator | Color Shift (ΔE) Basecoat Color | | |
|---|---|---|---|
| | White | Red | Blue |
| AT-1 | 0.12 | 0.29 | 0.29 |
| AT-1 w/0.5 wt % 20 nm silicon oxide | 0.35 | 0.47 | 0.13 |
| AT-1 w/0.5% wt % 10 nm aluminum oxide | 0.32 | 0.21 | 0.20 |
| AT-1 w/0.5% wt % 40 nm aluminum oxide | 0.18 | 0.26 | 0.29 |

Paint system: Aerodur 3001/3002 (polyurethane) basecoat-clearcoat system by AkzoNobel.

AT-1 with or without nanoparticles is applied between basecoat and clearcoat

No or only small shift in color with AT-1

No or only small additional color shift when nanoparticle is added at maximum concentration expected Concentration is by nanoparticle weight and not dispersion weight. Nanoparticles come in 20 to 50 wt % dispersions from manufacturer.

This example demonstrates the treatment can be used with a colored basecoat and a subsequent clearcoat added on top without significantly shifting the color of the basecoat. This, of course, is not an issue if the top coat is also colored. For coatings requiring clear top coats, nanoparticles other than carbon black need to be used.

It is to be understood that, if any prior art publication is referred to herein, such reference does not constitute an admission that the publication forms a part of the common general knowledge in the art.

In the claims which follow and in the preceding description of aspects, except where the context requires otherwise due to express language or necessary implication, the word "comprise" or variations such as "comprises" or "comprising" is used in an inclusive sense, i.e. to specify the presence of the stated features but not to preclude the presence or addition of further features in various aspects of the present disclosure.

It will be appreciated by persons skilled in the art that numerous variations and/or modifications may be made to the disclosure as shown in the specific aspects without departing from the spirit or scope of the present disclosure as broadly described. The present aspects are, therefore, to be considered in all respects as illustrative and not restrictive.

The invention claimed is:

1. A method of reactivating a surface of an organic paint coating present on a substrate, the method comprising: applying, at a humidity of less than 5 millibar (mb) partial water vapor pressure at a temperature of about 10° C. to 35° C., a surface treatment to the organic paint coating, the surface treatment consisting of a solvent, an organic nanoparticle, optionally an additive, and a surface exchange agent selected from the group consisting of a titanate, zirconate, and chelates thereof, wherein the organic nanoparticle is carbon black having a particle size of between about 1 and about 160 nm.

2. A method of facilitating adhesion of a coating to an organic paint coating disposed on a substrate, the method comprising: applying, at a humidity of less than 5 millibar (mb) partial water vapor pressure at a temperature of about 10° C. to 35° C., a surface treatment to the organic paint coating to form a reactivated organic paint coating, the surface treatment consisting of a solvent, an organic nanoparticle, optionally an additive, and a surface exchange agent selected from the group consisting of a titanate, zirconate, and chelates thereof, wherein the organic nanoparticle is carbon black having a particle size of between about 1 and about 160 nm; and depositing a second coating on the reactivated organic paint coating.

3. The method according to claim 1, wherein the solvent, agent, organic nanoparticle, and additive, are applied as a single mixture to the organic paint coating.

4. The method according to claim 1, wherein the solvent is an organic solvent selected from a ketone, alcohol, ether, or combinations thereof.

5. The method according to claim 4, wherein the organic solvent is a glycol, glycol ether, alcohol, glycol monoether alcohol, or combinations thereof.

6. The method according to claim 5, wherein the organic solvent is an ether:alcohol combination that is a glycol diether:$C_{1-6}$ alcohol or $C_{1-4}$ alcohol.

7. The method according to claim 6, wherein the glycol diether is dipropylene glycol dimethyl ether and the $C_{1-4}$ alcohol is isopropanol and/or n-propanol.

8. The method according to claim 1, wherein the solvent is present in an amount from about 90% to about 99% based on total weight of the surface treatment.

9. The method according to claim 1, wherein the surface exchange agent is a $C_{1-10}$ alkyl titanate, a $C_{1-10}$ alkyl zirconate, or a chelate thereof.

10. The method according to claim 9, wherein the $C_{1-10}$ alkyl titanate or a chelate thereof is tetra-n-propyltitanate or the $C_{1-10}$ alkyl zirconate or a chelate thereof is tetra-n-propylzirconate.

11. The method according to claim 1, wherein the surface exchange agent is present in an amount from about 1% to about 8% based on total weight of the surface treatment.

12. The method according to claim 1, wherein the organic nanoparticle is present in an amount of less than about 0.5% based on total weight of the surface treatment.

13. The method according to claim 1, wherein the surface treatment consists of the solvent, organic nanoparticle, additive, and surface exchange agent.

14. The method according to claim 1, wherein the additive is selected from the group consisting of rheology modifier, wetting agent, surfactant, dispersant, anti-foaming agent, levelling agent, colorant, anti-corrosion agent, and combination(s) thereof.

15. The method according to claim 1, wherein the additive is selected from the group consisting of colorant, anti-corrosion agent, and combination(s) thereof.

16. The method according to claim 1, wherein the additive is present in an amount of less than about 10% based on total weight of the surface treatment.

17. The method according to claim 1, wherein the formulation is a solution or emulsion.

18. The method according to claim 1, wherein the substrate is a substantially inelastic panel.

19. The method according to claim 1, wherein the substrate is a metal, metal alloy, or composite material.

20. The method according to claim 1, further comprising drying the surface of the organic paint coating.

21. The method according to claim 1, wherein color shift (ΔE) of the organic paint coating is less than 1 when measured after a second coating has been applied to the surface of the organic paint coating.

22. The method of claim 1, wherein the surface treatment comprises the organic nanoparticle in an amount of about 0.01% to about 1% based on total weight of the surface treatment.

23. The method of claim 22, wherein the surface treatment comprises the organic nanoparticle in an amount of about 0.01% to about 0.5% based on total weight of the surface treatment.

24. The method of claim 1, further comprising cleaning the organic paint coating after applying the surface treatment to the organic paint coating.

25. The method of claim 2, further comprising cleaning the organic paint coating after applying the surface treatment to the organic paint coating.

* * * * *